United States Patent
Kikuchi et al.

(10) Patent No.: US 6,833,210 B2
(45) Date of Patent: Dec. 21, 2004

(54) FUEL CELL

(75) Inventors: Hideaki Kikuchi, Kawachi-gun (JP);
Narutoshi Sugita, Utsunomiya (JP);
Seiji Sugiura, Utsunomiya (JP);
Hiroyuki Tanaka, Utsunomiya (JP);
Toshiya Wakahoi, Utsunomiya (JP);
Keisuke Andou, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 179 days.

(21) Appl. No.: 10/287,966

(22) Filed: Nov. 4, 2002

(65) Prior Publication Data

US 2003/0087140 A1 May 8, 2003

(30) Foreign Application Priority Data

Nov. 7, 2001 (JP) ......................................... 2001-342435

(51) Int. Cl.[7] ................................................ H01M 8/04
(52) U.S. Cl. ............................. 429/26; 429/35; 429/38
(58) Field of Search ............................. 429/26, 35, 38

(56) References Cited

U.S. PATENT DOCUMENTS

2002/0150810 A1 * 10/2002 Mizuno ....................... 429/35
2004/0038109 A1 * 2/2004 Bernacki ...................... 429/35
2004/0062967 A1 * 4/2004 Chaix ........................... 429/32

FOREIGN PATENT DOCUMENTS

| JP | 7-249417 | 9/1995 |
| WO | WO 00/39862 A1 | 7/2000 |

\* cited by examiner

*Primary Examiner*—John S. Maples
(74) *Attorney, Agent, or Firm*—Lahive & Cockfield, LLP; Anthony A. Laurentano, Esq.

(57) ABSTRACT

A fuel cell that is small and light has separators having communication ports for reaction gases and cooling medium that are provided on an outer side of gas sealing members so as to penetrate each of the separators, and communication paths that detour around the gas sealing members in the thickness direction of the separators and connect the reaction gas communication ports with reaction gas flow passages. Furthermore, support members are provided to support the portions of the separators at which the gas sealing members and the cooling surface sealing member are disposed so as to be offset with respect to each other as viewed in the stacking direction.

4 Claims, 19 Drawing Sheets

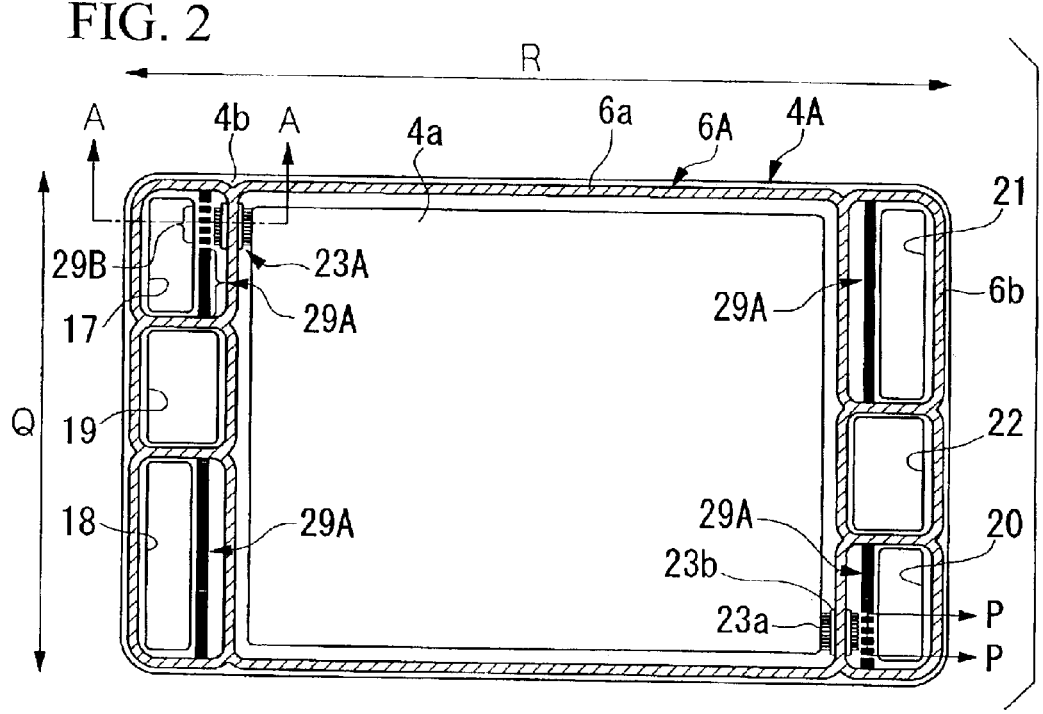
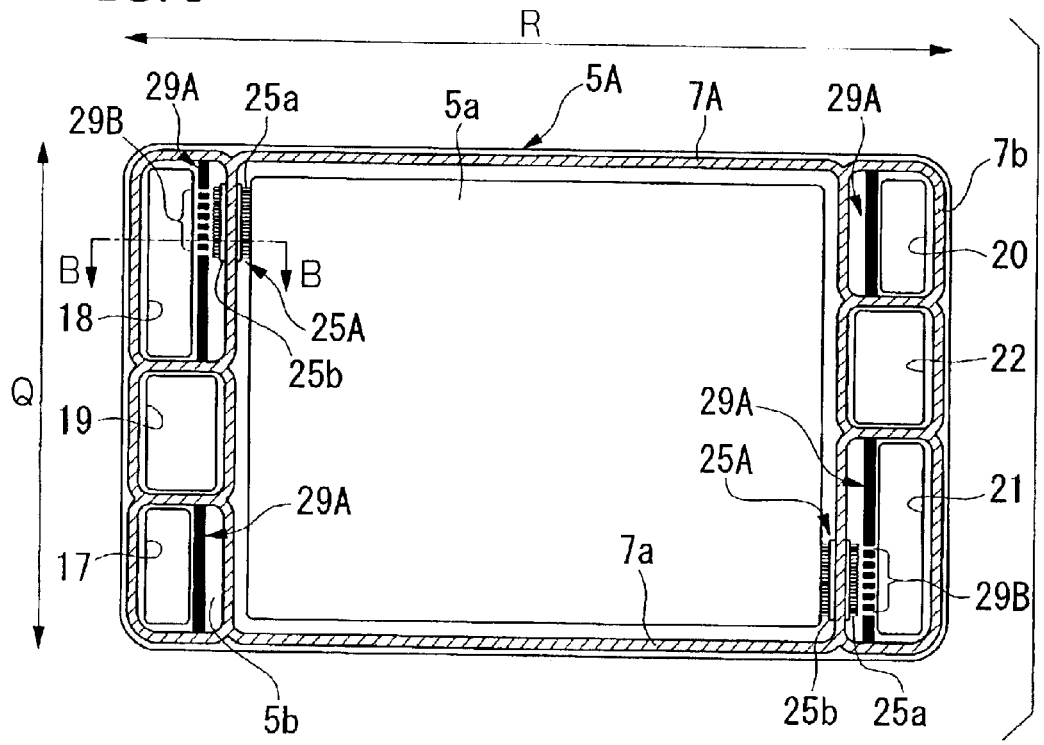

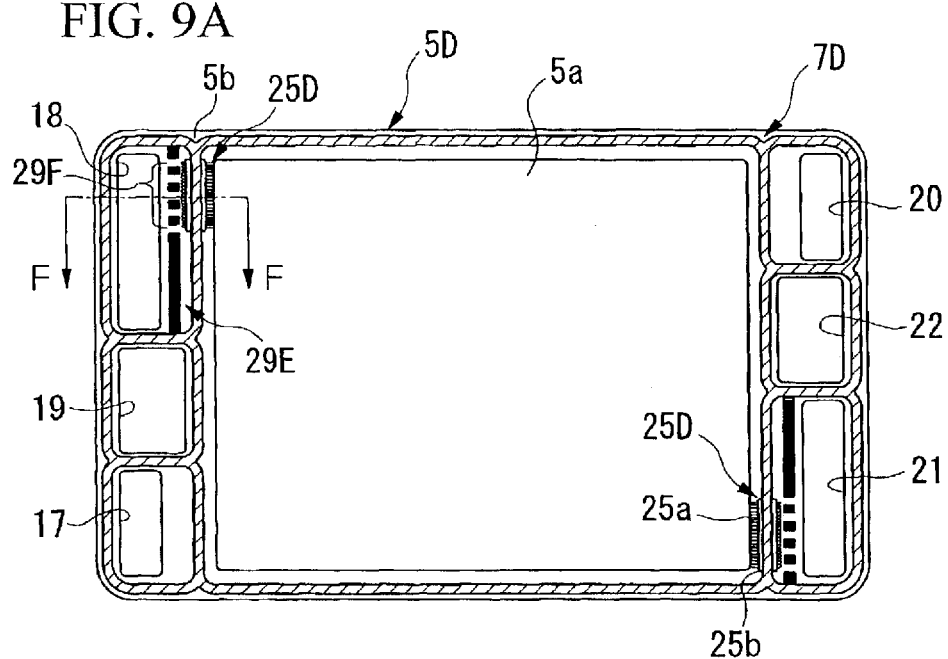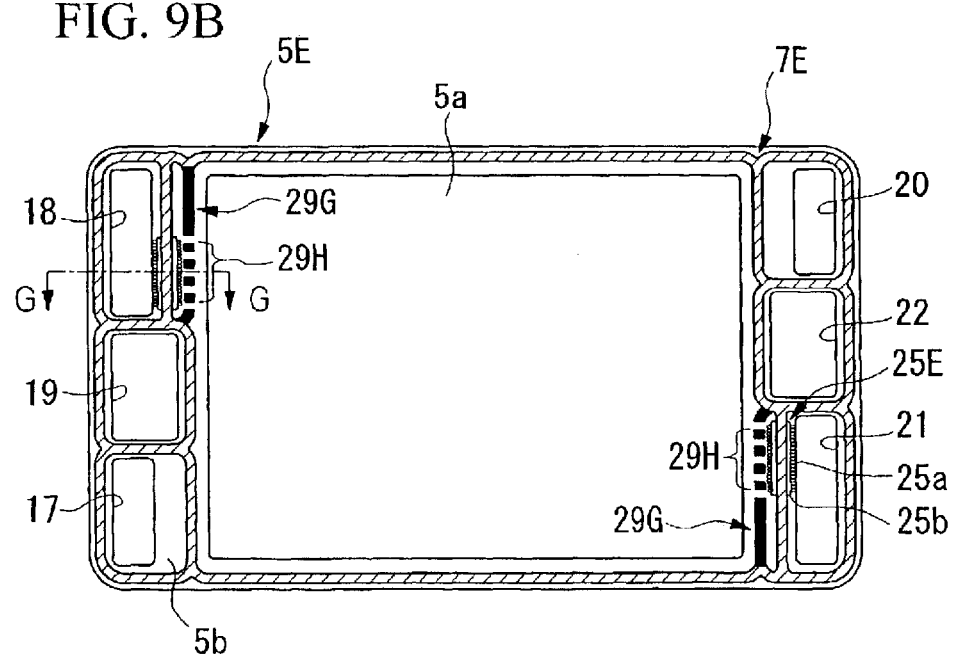

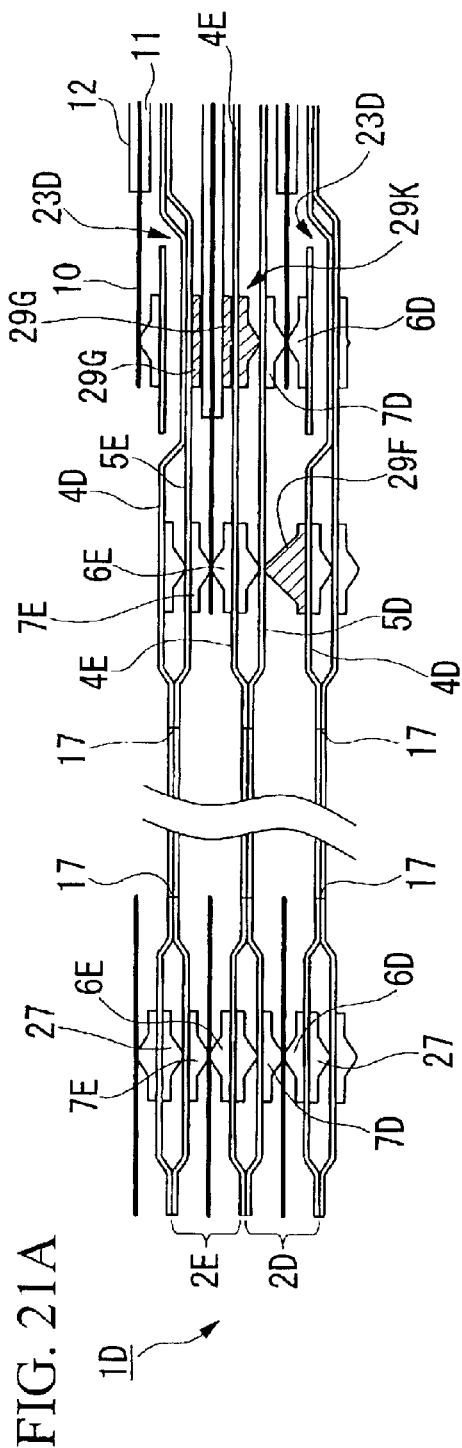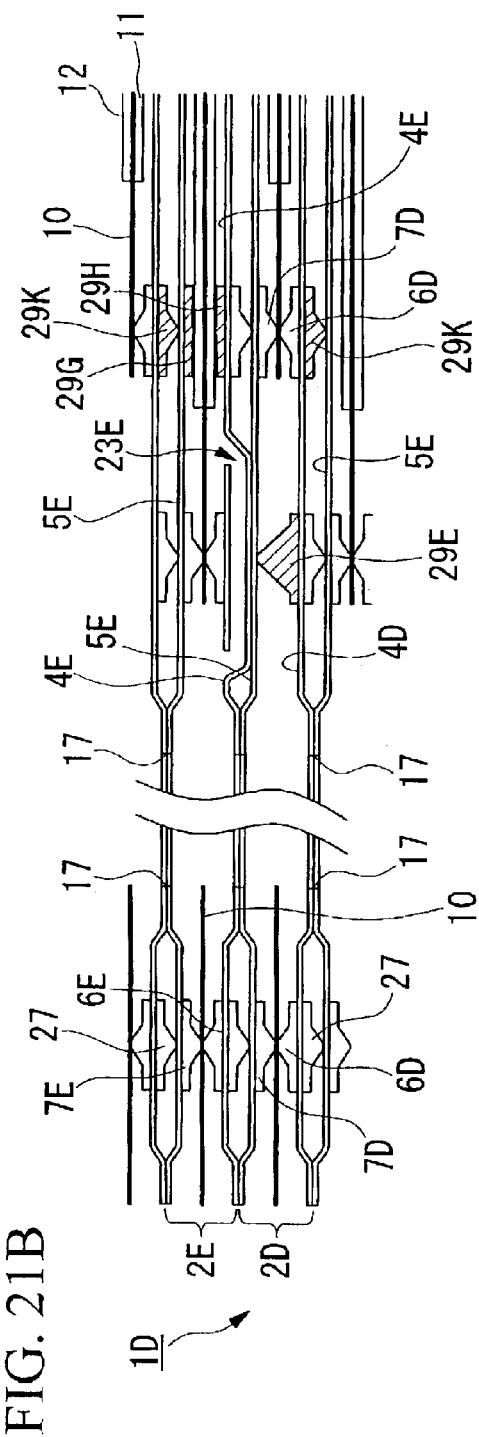
FIG. 21A
FIG. 21B

FUEL CELL

BACKGROUND OF THE INVENTION

1. Field of the Invention

The present invention relates to a fuel cell formed by stacking a plurality of fuel cell units that are formed by sandwiching an electrode assembly between separators.

2. Description of the Related Art

Among fuel cell units forming fuel cell stacks, there is one type that is formed in a plate shape by sandwiching between a pair of separators a membrane electrode assembly that is formed by placing an anode electrode and a cathode electrode respectively on either side of a solid polymer electrolyte membrane. A fuel cell is formed by stacking in the thickness direction of the fuel cell units a plurality of fuel cell units that are constructed in this way.

In each fuel cell unit there are provided a flow passage for fuel gas (for example, hydrogen) on one surface of the anode side separator that is positioned facing the anode electrode, and a flow passage for oxidizing gas (for example, air that contains oxygen) on one surface of the cathode side separator that is positioned facing the cathode electrode. In addition, a flow passage for a cooling medium (for example, pure water) is provided between adjacent separators of adjacent fuel cell units.

When fuel gas is supplied to the electrode reaction surface of the anode electrode, hydrogen is ionized there and moves to the cathode electrode via the solid polymer electrolyte membrane. Electrons generated during this process are extracted to an external circuit and used as direct current electrical energy. Because oxidizing gas is supplied to the cathode electrode, hydrogen ions, electrons, and oxygen react to generate water. Because heat is generated when water is created at the electrode reaction surface, the electrode reaction surface is cooled by a cooling medium made to flow between the separators.

The fuel gas, oxidizing gas (generically known as reaction gas), and the cooling medium each must flow through a separate flow passage. Therefore, sealing technology that keeps each flow passage sealed in a fluidtight or airtight condition is essential.

Examples of portions that must be sealed are: the peripheries of penetrating supply ports formed in order to supply and distribute reaction gas and cooling medium to each fuel cell unit of the fuel cell; the peripheries of discharge ports that collect and discharge the reaction gas and the cooling medium that are discharged from each fuel cell unit; the outer peripheries of the membrane electrode assemblies; and the outer peripheries between the separators of adjacent fuel cell units. A material that is soft yet also has appropriate resiliency such as organic rubber is employed for the sealing member.

In recent years, however, size and weight reduction, as well as a reduction in the cost of fuel cells, have become the main barriers in progress towards the more widespread application of fuel cells through their being mounted in practical vehicles.

Methods that have been considered for reducing the size of fuel cells include making each fuel cell unit forming the fuel cell thinner, more specifically, reducing the size of the space between separators while maintaining a maximum size for the reaction gas flow passage formed inside each fuel cell unit; and also making the separators thinner.

However, there is a limit to how thin the separators can be made due to the strength requirements for each separator and by the rigidity requirements for the fuel cell. Reducing the height of the sealing members is effective in reducing the size of the spacing between separators; however, the height of the sealing members must be sufficient for the sealing members to be able to be pressed down enough to ensure that the required sealing performance is obtained. Therefore, there is also a limit to how much the height of the sealing members can be reduced.

Furthermore, in a fuel cell unit, although the space occupied by the sealing members is indispensable in order for the reaction gas and cooling medium to be sealed in, because this space contributes substantially nothing to power generation, it must be made as small as possible.

FIG. 24 is a plan view showing a conventional fuel cell stack. In FIG. 24 the reference numeral 70 indicates a communication port such as a fuel gas supply port and discharge port, an oxidizing gas supply port and discharge port, and a cooling medium supply port and discharge port that each penetrate the fuel cell stack in the direction in which separators 71 are stacked. The reference numeral 72 indicates an area in which a plurality of fuel gas flow passages, oxidizing gas flow passages, and cooling medium flow passages running along the separators 71 are formed.

FIG. 25 is a longitudinal cross-sectional view of a conventional fuel cell stack 73 taken along the line X—X in FIG. 24. As can be seen in plan view, in order to make the space occupied by the sealing member, that does not contribute to power generation, as small as possible, conventionally, by locating gas sealing members 76 and 77, which respectively seal a fuel gas flow passage 74 and an oxidizing gas flow passage 75, together with a cooling surface sealing member 78, which seals a cooling medium flow passage, aligned in a row in the stacking direction of the fuel cell units 79, the outer dimensions in the stacking direction of the fuel cell stack 73 are restrained to the minimum.

However, the drawback with the fuel cell stack 73 that is constructed in this manner is that if the gas sealing members 76 and 77 that seal the flow passages 74 and 75 as well as the cooling surface sealing member 78 are all placed in a row in the stacking direction of the fuel cell unit 79, then the thickness of the fuel cell stack 73 cannot be made less than a value obtained by adding the height of the cooling surface sealing member 78 to the thickness of each fuel cell unit 79, and multiplying this result by the number of fuel cell units stacked in the fuel cell stack.

In order to explain this more specifically, the discussion will return to FIG. 25. According to FIG. 25, the fuel gas supply port 70 and the fuel gas flow passage 74 that are isolated in a sealed state by the gas sealing members 76 and 77 are connected by a communication path 80. The communication path 80 is provided in the separator 81 in the vicinity of the fuel gas supply port 70 so as to detour around, in the thickness direction of the separator 81, the gas sealing member 77 that seals the entire periphery of the fuel gas flow passage 74. Moreover, the separator 82 also has a similar communication path (not shown) in the vicinity of the oxidizing gas supply port (not shown).

Accordingly, each of the separators 81 and 82 are formed relatively thickly in order to form the communication path 80; however, as is seen in the cross section in FIG. 25, at the position of the seal line where each of the sealing members 76 to 78 are placed, the separators 81 and 82 are formed with the minimum thickness needed to ensure the required strength, and it is not possible to make them any thinner.

Moreover, because each of the sealing members 76 to 78 is formed with the minimum height needed to secure the sealing performance, it is not possible to reduce the height of the sealing members 76 to 78 any further.

As a result, although the thickness of the fuel cell stack 73 is found by multiplying the number of stacks by the sum of the minimum thickness of the two separators 81 and 82, the thickness needed to form the communication path 80, the height of the two gas sealing members 76 and 77, the thickness of the solid polymer electrolyte membrane 83, and the height of the cooling surface sealing member 78, because these are all indispensable, it is extremely difficult to achieve any further reduction in thickness.

As a countermeasure for reducing the overall thickness of such a fuel cell stack 73, it is proposed that the gas sealing members 76 and 77 and the cooling surface sealing member 78 be disposed so as to be offset with respect to each other as viewed in the stacking direction. Accordingly, it is possible to greatly reduce the dimension in the stacking direction of the fuel cell stack 73 by reducing the height of the cooling surface sealing member 78 that is needed to ensure the sealing performance, while, on the other hand, the thickness of the portions of the separators 81 and 82 where the communication paths are formed is ensured.

However, by disposing the gas sealing members 76 and 77 and the cooling surface sealing member 78 so as to be offset with respect to each other, the sealing portions of each fuel cell unit are not aligned in a row in the stacking direction. As a result, sealing pressures applied to the gas sealing members 76 and 77 and the cooling surface sealing member 78 that are disposed so as to be offset with respect to each other are reduced. Consequently, when the stacked fuel cell units are tightened in the stacking direction, the reaction force produced by the cooling surface sealing member that is being compressed may deform the separators, which may degrade the sealing performance of the sealing members, and may lead to the leakage of the reaction gases and the cooling medium across the portions of the gas sealing members 76 and 77 and the cooling surface sealing member 78 around the deformed portions of the separators. Because the separators 81 and 82 must be sufficiently thick to ensure the rigidity thereof, it is not possible to make the fuel cell stack 73 any smaller.

SUMMARY OF THE INVENTION

The present invention was conceived in view of the above circumstances, and it is an object thereof to provide a fuel cell that has been made lighter and smaller by reducing the thickness thereof, while reliably sealing the respective flow passages using the respective sealing members between the separators and the membrane electrode assemblies that form the fuel cell.

In order to solve the above problems, a first aspect of the present invention provides a fuel cell comprising fuel cell units, the fuel cell units being stacked and having at least one cooling medium flow passage therebetween, and the cooling medium flow passage sealed by a cooling surface sealing member, each fuel cell unit comprising: an electrode assembly formed by disposing an electrode on each side of an electrolyte; separators that sandwich the electrode assembly in the thickness direction thereof; and gas sealing members that are disposed at an outer peripheral portion of the electrode assembly, and that seal respective reaction gas flow passages that are formed between each separator and the electrode assembly and are bounded by the separators and electrode assembly, wherein in each of the separators there are provided reaction gas communication ports and cooling medium communication ports that penetrate each of the separators in the thickness direction thereof, and communication paths that detour around the gas sealing members in the thickness direction of the separators and connect the reaction gas communication ports with the reaction gas flow passages; and the portions of the separators, at which the gas sealing members and the cooling surface sealing member are disposed so as to be offset with respect to each other as viewed in the stacking direction, are supported by support members.

According to the fuel cell of the present invention, because the rigidities of the portions of the separators, at which the gas sealing members and the cooling surface sealing member are disposed so as to be offset with respect to each other, are ensured, it is possible to apply sufficient sealing pressure to the gas sealing members and the cooling surface sealing member that are disposed so as to be offset with respect to each other.

A preferable material for the support members depends on the positions thereof, and an electrical insulation material such as rubber or resin is preferably used for the support members that are disposed between the separators between which the electrode assembly is disposed. On the other hand, when the support members are disposed on the cooling surface of the separators, a conductive material having corrosion resistance such as stainless steel or carbon, or an electrical insulation material such as rubber or resin may preferably be used for the support members. When the support members are disposed between the electrode assembly and the separators, one of the above conductive materials having corrosion resistance is also preferably used. A fuel cell to which the present invention will be applied may be of a solid polymer type, a solid electrolyte type, an alkaline type, a phosphoric acid type, or a molten carbonate type.

In the fuel cell of the present invention, the communication paths in one fuel cell unit and the corresponding communication paths in the adjacent fuel cell unit in the stacking direction may be disposed so as to be offset with respect to each other as viewed in the stacking direction, and preferably, at least a portion of each of the support members may support a portion of the separators at which the communication paths are formed.

Accordingly, because the rigidities of the portions of the separators, at which the communication paths are disposed so as to be offset with respect to each other, are increased, the thicknesses of the portions of the separators may be reduced, and the portions of the separators may be disposed so as to be offset with respect to each other as viewed in the stacking direction.

In the fuel cell of the present invention, each of the support members disposed over the reaction gas flow passages or the cooling medium flow passage may be provided with communication recesses that allow the reaction gases or the cooling medium to flow through.

Accordingly, the reaction gases or the cooling medium can be supplied through the communication recesses, and the rigidities of the portions of the separators, at which the support members are provided, can be increased.

BRIEF DESCRIPTION OF THE DRAWINGS

FIG. 2 is a plan view showing a state in which a gas sealing member and support members are provided on one separator forming the fuel cell unit shown in FIG. 1.

FIG. 3 is a plan view showing a state in which a gas sealing member and support members are provided on another separator forming the fuel cell unit shown in FIG. 1.

FIGS. 9A and 9B are plan views showing, in a manner similar to that in FIG. 3, another separator of a fuel cell stack according to a fourth embodiment of the present invention.

FIG. 21A is a longitudinal cross-sectional view taken along the line D—D in FIG. 8A showing the fuel cell units according to the fourth embodiment of the present invention, and FIG. 21B is a longitudinal cross-sectional view taken along the line E—E in FIG. 8B showing the fuel cell units according to the fourth embodiment of the present invention.

DESCRIPTION OF THE PREFERRED EMBODIMENTS

The fuel cell stack according to several embodiments of the present invention will now be described in detail with reference to the drawings.

Figure 1:
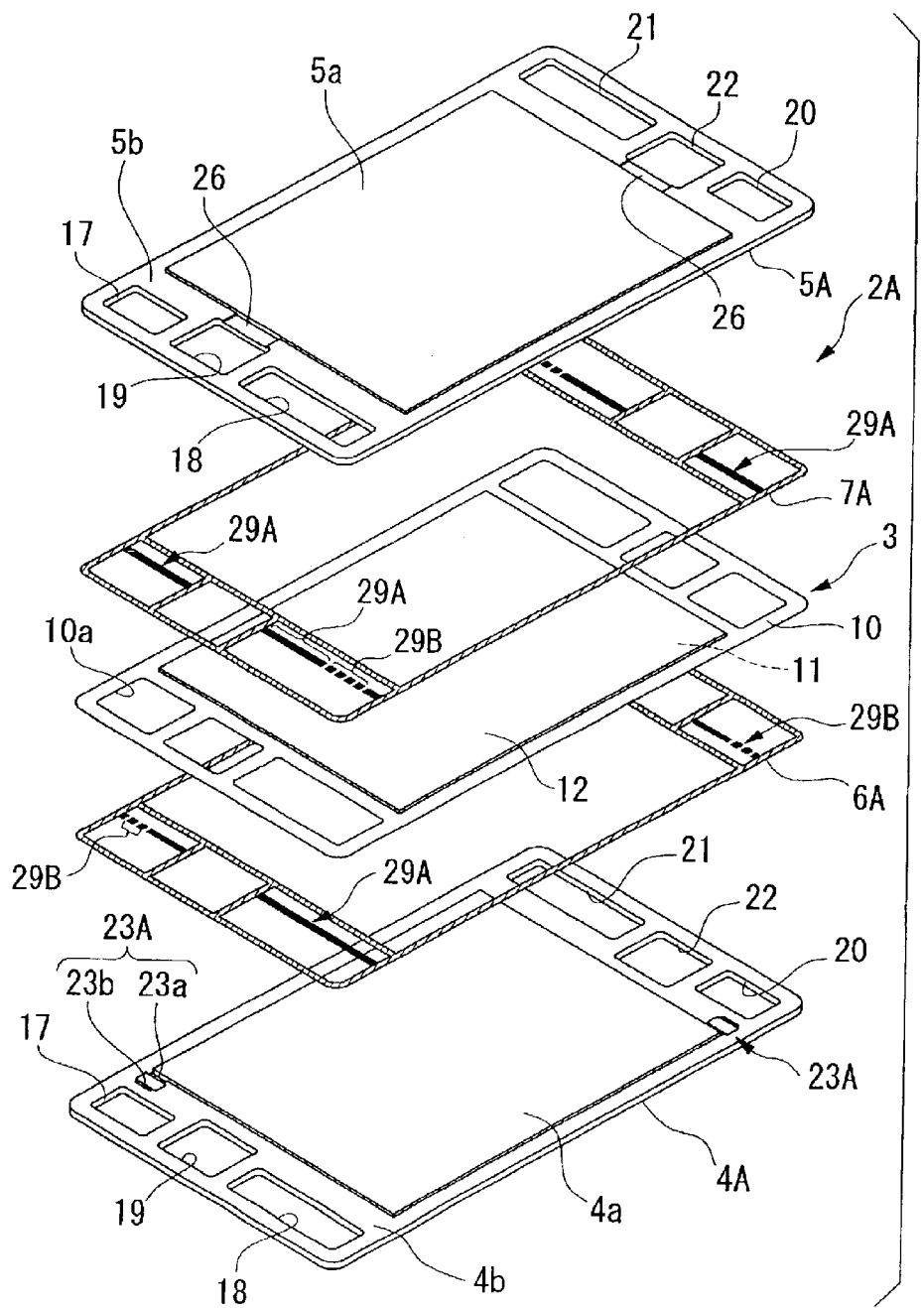
FIG. 1 is a schematic diagram showing a fuel cell unit forming the fuel cell stack according to a first embodiment of the present invention.
Figure 12:
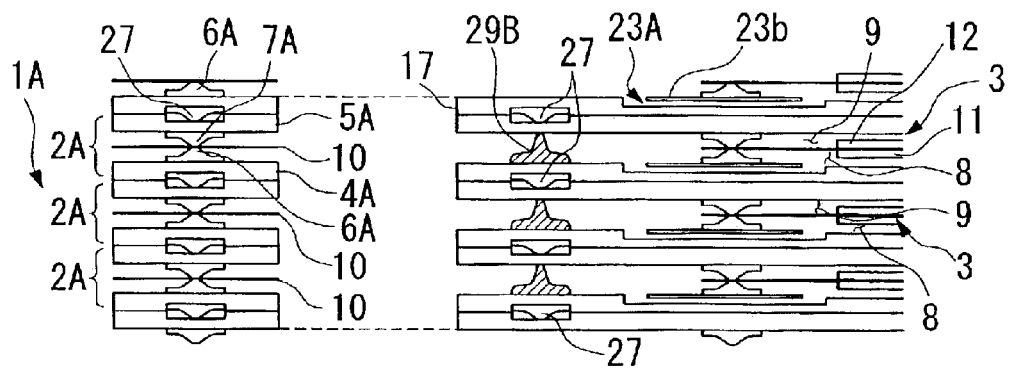
FIG. 12 is a longitudinal cross-sectional view taken along the line A—A in FIG. 2 showing the fuel cell units shown in FIG. 1.

FIG. 1 is a schematic diagram showing the fuel cell unit forming the fuel cell stack according to the first embodiment of the present invention. As shown in FIG. 12, the fuel cell stack 1A according to the present embodiment is formed by stacking a plurality of fuel cell units 2A. As shown in FIG. 1, the fuel cell unit 2A is formed by sandwiching a membrane electrode assembly 3 between a pair of separators 4A and 5A. Between the membrane electrode assembly 3 and each of the separators 4A and 5A are disposed respectively gas sealing members 6A and 7A. As shown in FIG. 12, these gas sealing members 6A and 7A delimit a fuel gas flow passage 8 and an oxidizing gas flow passage 9 so as to seal them on either side of the membrane electrode assembly 3.

Figure 5:
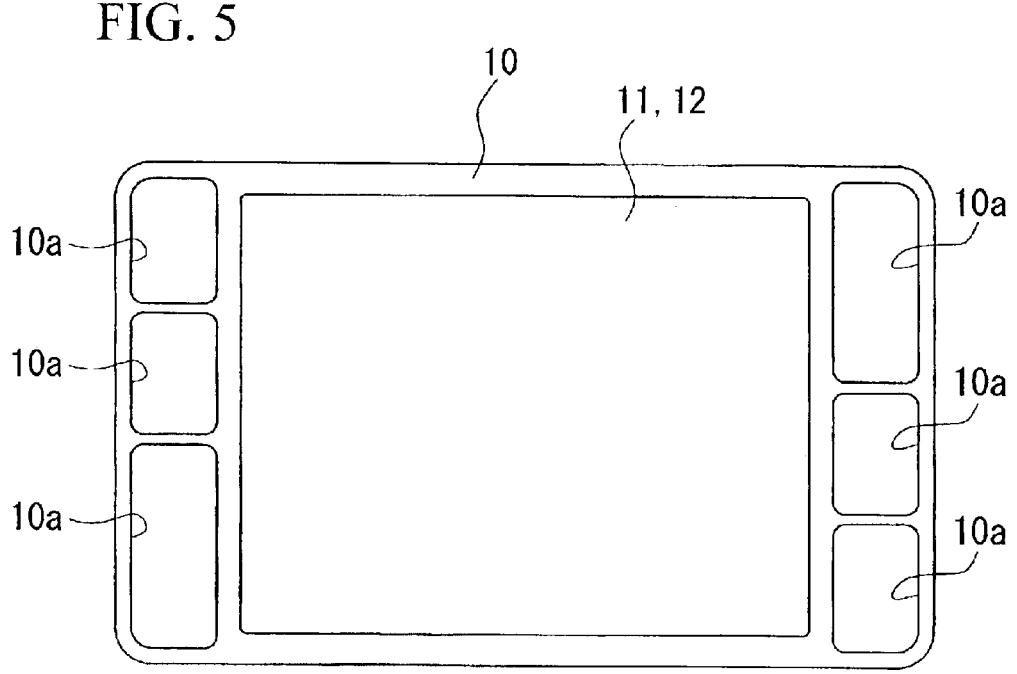
FIG. 5 is a plan view showing an electrode assembly forming the fuel cell unit shown in FIG. 1.

As shown in FIG. 5 and FIG. 12, the membrane electrode assembly 3 has, for example, a solid polymer electrolyte membrane 10 (hereinafter simply referred to as an electrolyte membrane) formed from a perfluorosulfonate polymer, and an anode electrode 11 and a cathode electrode 12 that sandwich two surfaces of the electrolyte membrane 10.

As shown in FIG. 5, the electrolyte membrane 10 has, for example, a plurality of through holes 10a. The electrolyte membrane 10 is the equivalent size to the separators 4A and 5A that are described below, and each of the through holes 10a is placed at a position that corresponds to the respective supply ports 17 to 19 and discharge ports 20 to 22 of the separators 4A and 5A.

The anode electrode 11 and the cathode electrode 12 are constructed, for example, by providing a catalyst layer, formed from an alloy having Pt (platinum) as the main constituent, on a surface of a gas diffusion layer as a base formed from porous carbon cloth or porous carbon paper that contacts with the electrolyte membrane 10.

Two types of separator 4A and 5A may be used for the separators 4A and 5A that form the fuel cell units 2A. As shown in FIGS. 2 and 3, each of the separators 4A and 5A is formed from: corrugated portions 4a and 5a made up of a plurality of indentations and bumps that have a fixed height and are formed in a fixed pattern by excavating a plurality of grooves (not shown) in a surface of a flat plate made from carbon; a fuel gas supply port (communication port) 17, an oxidizing gas supply port (communication port) 18, a cooling medium supply port (communication port) 19, a fuel gas discharge port (communication port) 20, an oxidizing gas discharge port (communication port) 21, and a cooling medium discharge port (communication port) 22 that each penetrate the two separators 4A and 5A so as to make possible both the supply and discharge of fuel gas (for example, hydrogen gas), oxidizing gas (for example, air that contains oxygen), and a cooling medium (for example, pure water) respectively that are made to flow through the corrugated portions 4a and 5a; and planar portions 4b and 5b that are disposed so as to surround each of the communication ports 17 to 22, and the corrugated portions 4a and 5a.

As shown in FIGS. 2 and 3, the cooling medium communication port 19 and the cooling medium communication port 22 are located substantially in the center in the transverse direction of the separators 4A and 5A (i.e., the direction indicated by the arrow Q in FIG. 2). The fuel gas communication port 17 and the oxidizing gas communication port 18 are located at both sides in the transverse direction of the separators 4A and 5A sandwiching the cooling medium communication port 19. Furthermore, the fuel gas communication port 20 and the oxidizing gas communication port 21 are located at both sides in the transverse direction of the separators 4A and 5A sandwiching the cooling medium communication port 22. The fuel gas communication port 20 and the oxidizing gas communication port 21 are located at diagonally opposite positions respectively to the fuel gas communication port 17 and the oxidizing gas communication port 18.

The lengths of the fuel gas communication 17 and the fuel gas communication port 20 and the lengths of the oxidizing gas communication port 18 and the oxidizing gas communication port 21 in the longitudinal directions of the separators 4A and 5A (the direction indicated by the arrow R in FIG. 2) are made to be shorter than the lengths of the adjacent cooling medium communication port 19 and cooling medium communication port 22. As a result, the size of the space from the fuel gas communication port 17 and the fuel gas communication port 20 and from the oxidizing gas communication port 18 and the oxidizing gas communication port 21 to the corrugated portions 4a and 5a is made larger than the size of the space from the cooling medium communication port 19 and the cooling medium communication port 22 to the corrugated portions 4a and 5a.

As shown in FIG. 2, between the fuel gas communication port 17 and the corrugated portion 4a and between the corrugated portion 4a and the fuel gas communication port 20 on one surface of the one separator 4A are formed communication paths 23A that respectively allow fuel gas supplied from the fuel gas communication port 17 to pass to the corrugated portion 4a, and fuel gas that has passed through the corrugated portion 4a to be discharged from the fuel gas communication port 20. Each of the communication paths 23A is provided with a plurality of grooves 23a formed on one surface of the separator 4A and a flat bridge plate 23b that extends right across the grooves 23a. On the front surface of the separator 4A where the bridge plate 23b is placed is formed a concave portion into which the bridge plate 23b is fitted. This concave portion enables the surface of the bridge plate 23b to be placed within the same planar surface as the surface 4b of the separator 4A.

As shown in FIG. 3, in the same way as for the separator 4A, communication paths 25A formed by a plurality of grooves 25a and a bridge plate 25b are also provided between the oxidizing gas communication port 18 and the corrugated portion 5a, and between the corrugated portion 5a and the oxidizing gas communication port 21 on one surface of the separator 5A.

Figure 4:
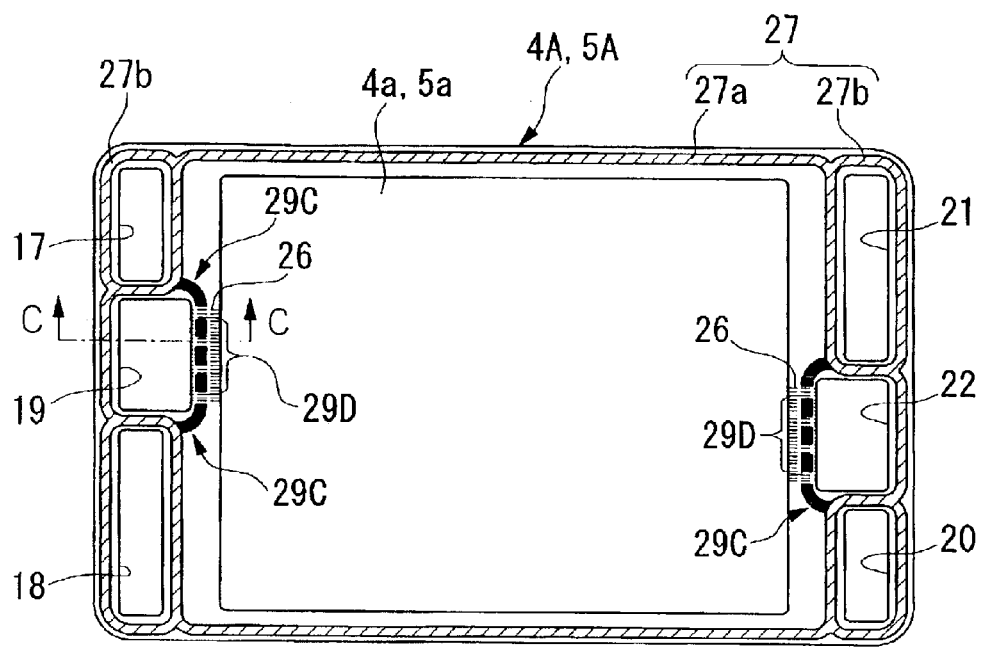
FIG. 4 is a plan view showing a state in which a cooling surface sealing member and support members are provided on the rear surfaces the separators shown in FIGS. 2 and 3.

As shown in FIG. 4, on the other sides of the two separators 4A and 5A are provided a communication path 26 that connects the cooling medium supply port 19 to the corrugated portions 4a and 5a, and a communication path 26 that connects the corrugated portions 4a and 5a to the cooling medium supply port 22.

As shown in FIGS. 2 and 3, the gas sealing members 6A and 7A are formed integrally in a configuration that has a plurality of sub-loop portions 6b and 7b that encircle each of the communication ports 17 to 22 on both sides of main-loop portions 6a and 7a that encircle the outer peripheries of the corrugated portions 4a and 5a. As seen in FIGS. 2 and 3, the main-loop portions 6a and 7a of the gas sealing members 6A and 7A are positioned so as to run along the planar portions 4b and 5b between the respective communication ports 17 to 22 and the corrugated portions 4a and 5a. As a result, the main-loop portions 6a and 7a pass over the top of the bridge plates 23b and 25b provided in the communication paths 23A and 25A, and the respective communication ports 17 to 22 are only connected with the corrugated portions 4a and 5a by the grooves 23a and 25a forming the communication paths 23 and 25. The remaining portions are sealed in a fluidtight state.

As shown in FIG. 12, the fuel cell units 2A that are formed in this manner are stacked with cooling surface sealing members 27 interposed between each fuel cell unit 2A. As shown in FIG. 4, each cooling surface sealing member 27 has a structure in which a main-loop portion 27a is joined integrally to sub-loop portions 27b. The main-loop portion 27a of the cooling surface sealing member 27 runs between the communication ports 17 and 18 of the fuel gas and oxidizing gas and the corrugated portions 4a and 5a, and also between the communication ports 20 and 21 and the corrugated portions 4a and 5a, and seals the periphery of a cooling medium flow passage 28 that connects the cooling medium communication port 19 to the corrugated portions 4a and 5a via the communication path 26, and connects the corrugated portions 4a and 5a to the cooling medium communication port 22 via the communication path 26. Moreover, the sub-loop portions 27b of the cooling surface sealing portion 27 independently seal each of the communication ports 17 and 18 and communication ports 20 and 21.

If the portions of the main-loop portion 27a of the cooling surface sealing member 27 that run between the communication ports 17 and 18 of the fuel gas and oxidizing gas and the corrugated portions 4a and 5a, and also between the communication ports 20 and 21 and the corrugated portions 4a and 5a are compared with the positions where the main-loop portions 6a and 7a of the above described gas sealing member 6A and 6B run along, then it can be seen that these portions of the main-loop portion 27a are placed at different positions from the main-loop portions 6a and 7a so as to run past positions closer to the communication ports 17 and 18 and to the communication ports 20 and 21.

In the present embodiment, there are provided support members 29A to 29D that support the portions of the separators 4A and 5A at which the gas sealing members 6A and 7A and the cooling surface sealing member 27 are disposed so as to be offset with respect to each other as viewed in the stacking direction. That is, as shown in FIGS. 2 and 3, the support members 29A and 29B supporting, via the separators 4A and 5A, the cooling surface sealing member 27 that is disposed so as to be offset from the gas sealing members 6A and 7A are provided to the gas sealing members 6A and 7A. Moreover, as shown in FIG. 4, the support members 29C and 29D are provided to the cooling surface sealing member 27 at the position that is offset from the gas sealing member 6A and 6B.

Cross sections of respective portions of a fuel cell stack 1A that is constructed in this manner are shown in FIGS. 11 to 14. Note that these figures merely show respective cross sections, and the broken lines indicate that the left portion and the right portion are actually connected as an element.

FIG. 12 is a longitudinal cross-sectional view with the cross section taken along the line A—A in FIG. 2. FIG. 12 shows a path that allows fuel gas to flow from the fuel gas communication port 17 that penetrates each of the separators 4A and 5A in the thickness direction thereof via the communication path 23A to the fuel gas flow passage 8 formed between the anode electrode 11 and the separator 4A.

As seen in FIG. 12, the gas sealing members 6A and 7A that seal the area between the membrane electrode assembly 3 and the pair of separators 4A and 5A placed on either side of the membrane electrode assembly 3 are placed sandwiching the electrolyte membrane 10 in the thickness direction thereof at respective positions corresponding each other in the stacking direction of the fuel cell unit 2A. The gas sealing member 6A for the fuel gas flow passage is placed on the bridge plate 23b that extends right across the communication path 23A formed in the separator 4A. That is, the communication path 23A detours around the gas sealing member 6A in the thickness direction of the separator 4A, and connects the interior of the gas sealing member 6A with the exterior thereof. The fuel gas that is supplied from the fuel gas communication port 17 on the exterior side of the gas sealing member 6A is able to flow into the fuel gas flow passage 8 on the interior side of the gas sealing member 6A.

In this case, the cooling surface sealing member 27 that seals off each fuel cell unit 2A and delimits the cooling medium flow passage 28 is placed at a position closer to the fuel gas communication port 17 than the communication path 23A. As a result, the cooling surface sealing member 27 and the grooves 23a forming the communication path 23A that are made by excavating one surface of the separator 4A in the thickness direction thereof are able to be placed in substantially the same plane as the separator 4A.

Moreover, the support members 29A and 29B are provided on the portions of the separators 4A and 5A at which the gas sealing members 6A and 7A and the cooling surface sealing member 27 are disposed so as to be offset with respect to each other. The support member 29B is shown in the cross section in FIG. 12. Because the portions of the separators 4A and 5A, at which the gas sealing members 6A and 7A and the cooling surface sealing member 27 are disposed so as to be offset with respect to each other, are supported by the support members 29A and 29B, the rigidities thereof are sufficiently ensured. Therefore, the thicknesses of the portions of the separators 4A and 5A can be sufficiently reduced while preventing deformation thereof. In addition, because it is possible to apply sufficient sealing pressure to the cooling surface sealing member 27 that is offset from the gas sealing members, sufficient sealing performance can be ensured even if the thicknesses of the portions of the separators 4A and 5A are reduced.

Figure 11:
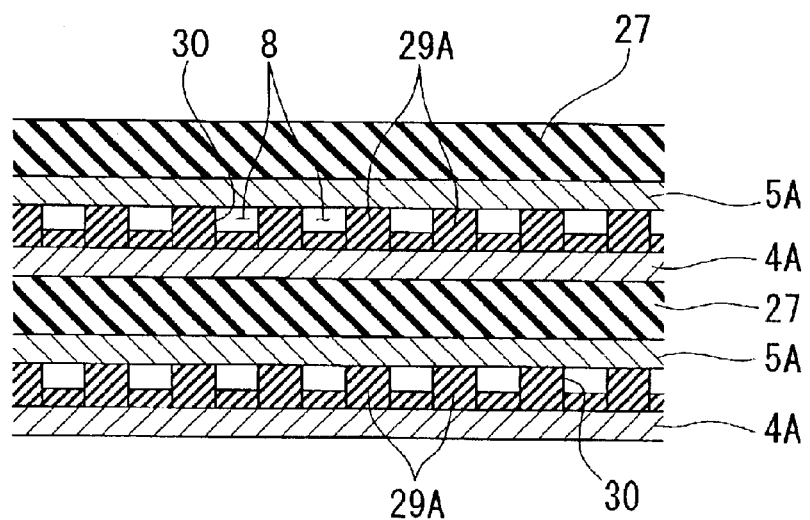
FIG. 11 is a longitudinal cross-sectional view taken along the line P—P in FIG. 2 showing the fuel cell units shown in FIG. 1.

In the present embodiment, as shown in FIGS. 2 and 3, two kinds of support members, i.e., the support members 29A and 29B, are provided for supporting the portions of the separators at which the cooling surface sealing member 27 is offset from the gas sealing members. The details of the support members 29A and 29B will be explained with reference to FIG. 11. FIG. 11 is a longitudinal cross-sectional view taken along the line P—P in FIG. 2 showing the fuel cell units shown in FIG. 1. The support member 29B placed so as to cross the fuel gas flow passage 8 has communication recesses 30 that are formed therein having concave cross sections. The communication recesses 30 allow the fuel gas to flow from the fuel gas flow passage 8, while on the other hand, the rigidities of the portions of the separators 4A and 5A where the support members 29B are provided can be increased. The support members 29A are not provided with the communication recesses 30; therefore, the rigidity of the separator can be further increased. An electrical insulation material is used to form the support members 29A and 29B.

Although the above description is for the fuel gas communication port 17, the same description also applies in the case of the fuel gas communication port 20.

Figure 13:
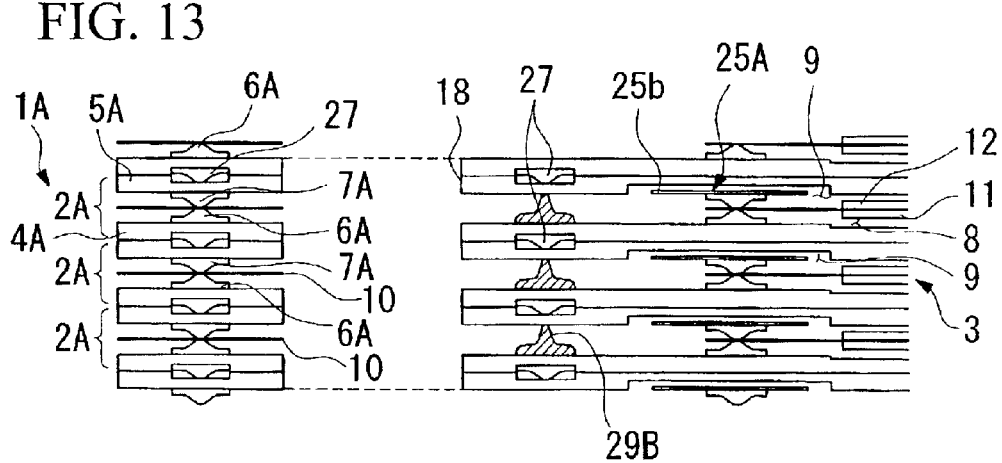
FIG. 13 is a longitudinal cross-sectional view taken along the line B—B in FIG. 3 showing the fuel cell units shown in FIG. 1.

Furthermore, FIG. 13 is a longitudinal cross-sectional view with the cross section taken along the line B—B in FIG. 3. FIG. 13 shows a path that allows oxidizing gas to flow from the oxidizing gas communication port 18 that penetrates each of the separators 4A and 5A in the thickness direction thereof via the communication path 25A to the oxidizing gas flow passage 9 formed between the cathode electrode 12 and the separator 5A.

As seen in FIG. 13 as well, the gas sealing members 6A and 7A that seal the area between the membrane electrode assembly 3 and the pair of separators 4A and 5A placed on either side thereof are placed sandwiching the electrolyte membrane 10 in the thickness direction thereof at respective positions corresponding each other in the stacking direction of the fuel cell unit 2A. The gas sealing member 7A is placed on the bridge plate 25b that extends right across the communication path 25A formed in the separator 5A. That is, the communication path 25A detours around the gas sealing member 7A in the thickness direction of the separator 5A, and connects the interior of the gas sealing member 7A with the exterior thereof. The oxidizing gas that is supplied from the oxidizing gas communication port 18 on the exterior side of the gas sealing member 7A is able to flow into the oxidizing gas flow passage 9 on the interior side of the gas sealing member 7A.

In this case, the cooling surface sealing member 27 that seals off each fuel cell unit 2A and delimits the cooling medium flow passage 28 is placed at a position closer to the oxidizing gas communication port 18 than the communication path 25A. As a result, the cooling surface sealing member 27 and the grooves 25a forming the communication path 25A that are made by excavating one surface of the separator 5A in the thickness direction thereof are able to be placed in substantially the same plane as the separator 5A. As in the case of the fuel gas communication port 17, because the support members 29A and 29B are provided on the portions of the separators 4A and 5A, at which the gas sealing members 6A and 7A and the cooling surface sealing member 27 are disposed so as to be offset with respect to each other, the thicknesses thereof can be sufficiently reduced while preventing deformation of the separators 4A and 5A, and while ensuring sufficient sealing performance.

The same description also applies in the case of the oxidizing gas communication port 21.

Figure 14:
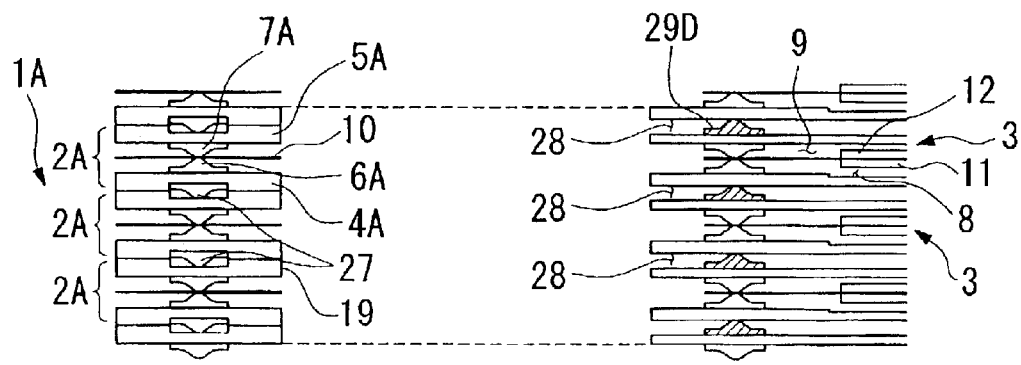
FIG. 14 is a longitudinal cross-sectional view taken along the line C—C in FIG. 4 showing the fuel cell units shown in FIG. 1.

FIG. 14 is a longitudinal cross-sectional view taken along the line C—C in FIG. 4. This drawing shows a cooling medium path that connects the cooling medium supply port 19 to the cooling medium flow passage 28 delimited by adjacent fuel cell units 2A and 2A, as well as the fuel gas flow passage 8, oxidizing gas flow passage 9, and cooling medium flow passage 28 that are delimited by the corrugated portions 4a and 5a. Moreover, as shown in FIG. 4, the support members 29C and 29D are provided on the surfaces of the separators 4A and 5A that form the cooling medium flow passage 28. These support members 29C and 29D support the load applied by the gas sealing members 6A and 7A so that the rigidities of the separators 4A and 5A are increased. In addition, the support member 29D placed so as to cross the cooling medium flow passage 28 is provided with communication recesses 30 as in the case of the support member 29B. A conductive material having corrosion resistance such as stainless steel or carbon may preferably be used for the support members 29C and 29D.

Accordingly, it is possible to greatly reduce the height occupied by the cooling surface sealing member 27 that is needed by the cooling surface sealing member 27 for it to provide a sufficient sealing performance, while at the same time maintaining the thickness of the separators 4A and 5A at the positions where the communication paths 23A and 25A are formed. Moreover, because the rigidities of the portions of the separators 4A and 5A, at which the gas sealing members 6A and 7A and the cooling surface sealing member 27 are disposed so as to be offset with respect to each other, are ensured, the thicknesses thereof can be sufficiently reduced while preventing deformation of the separators 4A and 5A, and while ensuring sufficient sealing performance. Therefore, the size of the fuel cell stack 1A can be greatly reduced.

Figure 15:
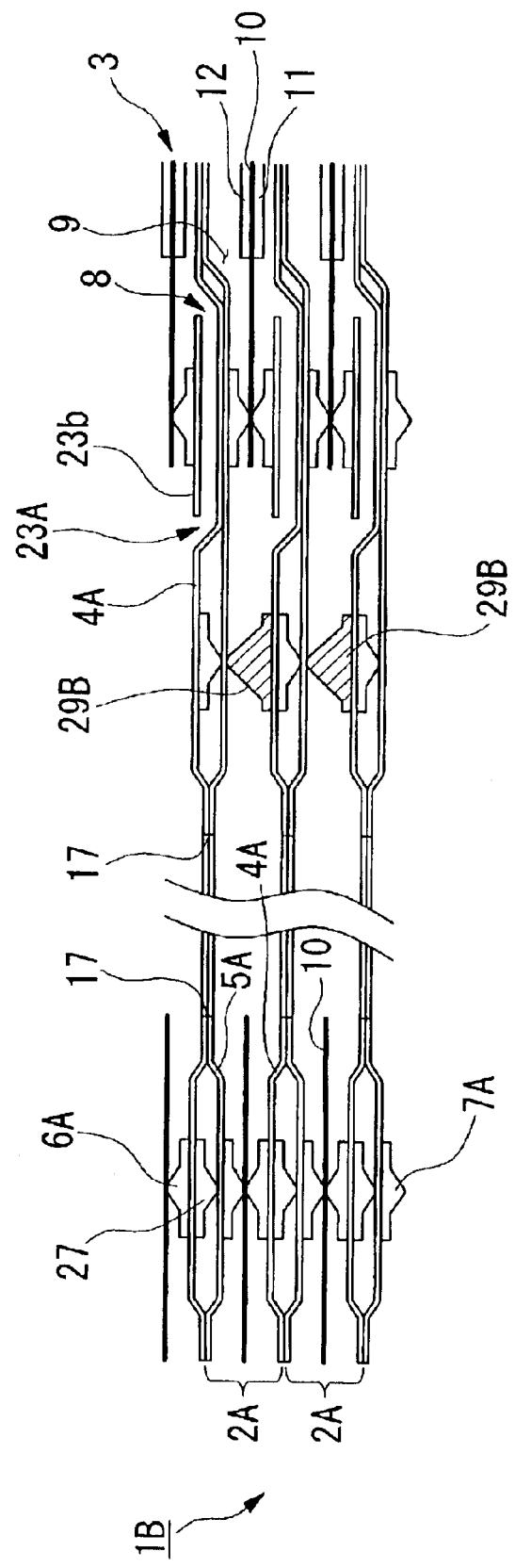
FIG. 15 is a longitudinal cross-sectional view showing, in a manner similar to that in FIG. 12, the fuel cell units according to a second embodiment of the present invention.
Figure 16:
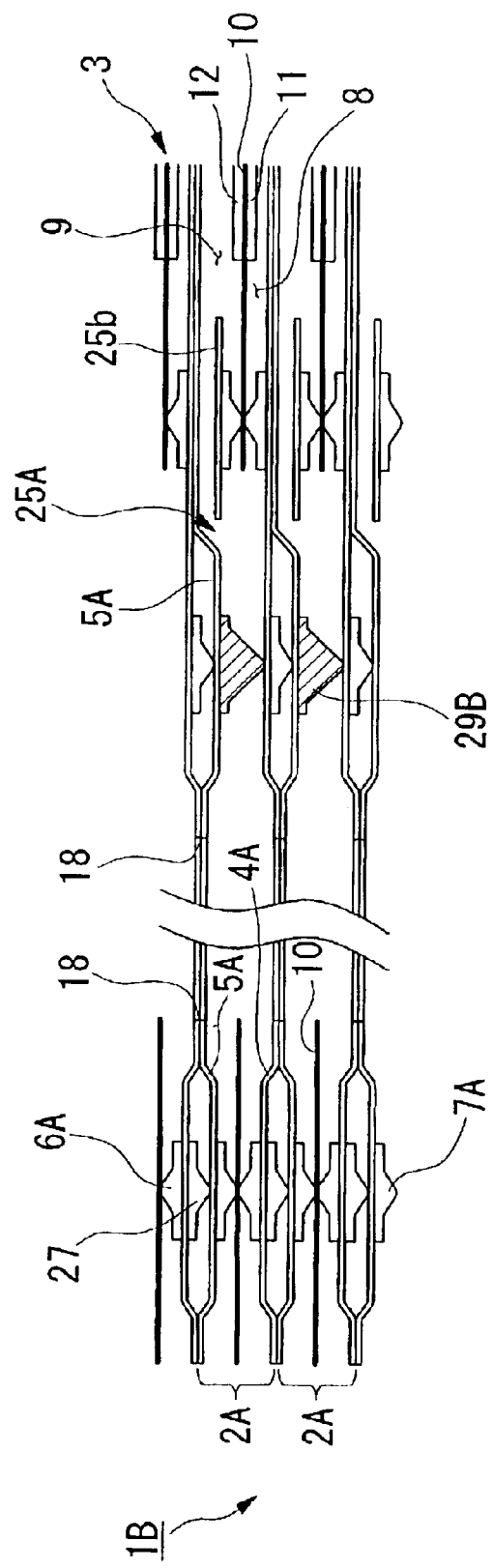
FIG. 16 is a longitudinal cross-sectional view showing, in a manner similar to that in FIG. 13, the fuel cell units shown in FIG. 15.
Figure 17:
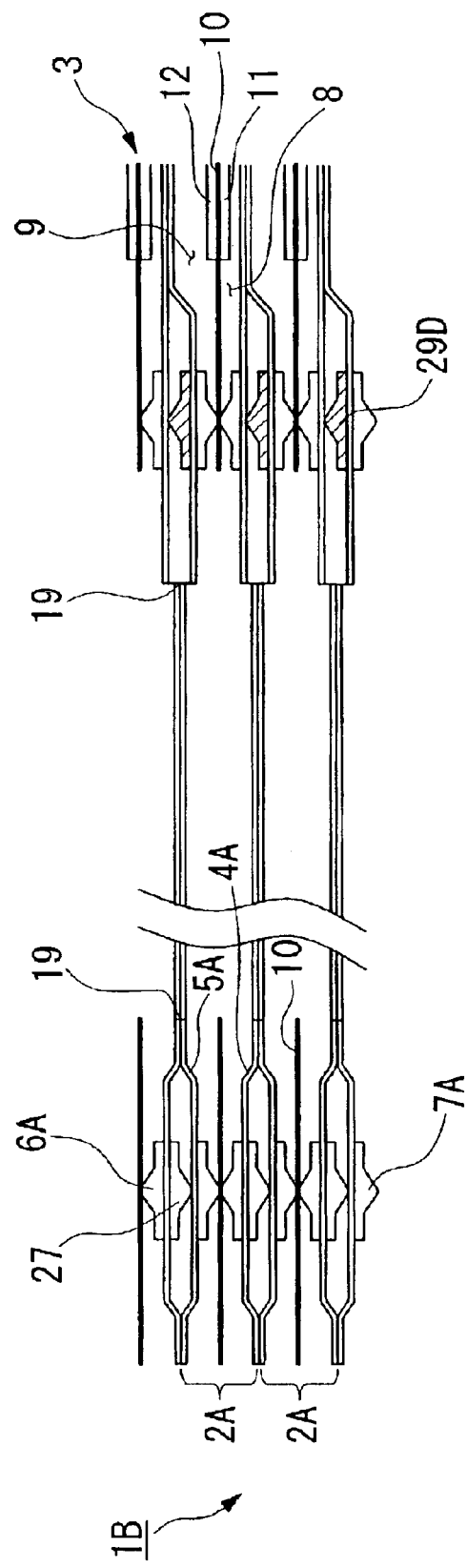
FIG. 17 is a longitudinal cross-sectional view showing, in a manner similar to that in FIG. 14, the fuel cell units shown in FIG. 15.

Next, another fuel cell stack 1B according to the second embodiment of the present invention will be explained below with reference to FIGS. 15 to 17.

The fuel cell stack 1B according to this embodiment differs from the fuel cell stack 1A according to the first embodiment in that the separators 4A and 5A that are made by press-forming thin metal plates into corrugated plates are employed instead of the carbon separators in the first embodiment.

In the fuel cell stack 1B according to this embodiment as well, the communication path 23A is formed by bending the separator 4A so as to make spaces from the gas sealing members 6A and 7A at a position where the gas sealing members 6A and 7A that sandwich two surfaces of the electrolyte membrane 10 are provided, and the gas sealing member 6A is supported by the bridge plate 23b that extends right across the communication path 23A. Accordingly, the communication path 23A detours around the gas sealing member 6A in the stacking direction of the separators 4A and 5A, and connects the interior of the gas sealing member 6A with the exterior thereof.

Moreover, the cooling surface sealing member 27 is placed at a position closer to the fuel gas communication port 17 than the communication path 23A, whereby the cooling surface sealing member 27 and the communication path 23A are placed in substantially the same plane as viewed in the stacking direction of the separators 4A and 5A. As a result, the gap between the separators 4A and 5A that oppose each other can be reduced, and the effect is obtained that it is possible to reduce the dimension in the stacking direction of the entire fuel cell stack 1B. In the same way as in the first embodiment, in this embodiment as well, because the support members 29A to 29D are provided, the thicknesses of the separators 4A and 5A can be sufficiently reduced while preventing deformation thereof, and while ensuring sufficient sealing performance. In addition, because the metallic separators may be formed thinner than the carbon separators, the size of the fuel cell stack 1B can be further reduced.

Next, another fuel cell stack 1C according to the third embodiment of the present invention will be explained below with reference to FIGS. 18 to 20. Note that, in this embodiment, the same reference symbols are applied to the common elements as in the first and second embodiments, and explanation thereof will be simplified.

Figure 18:
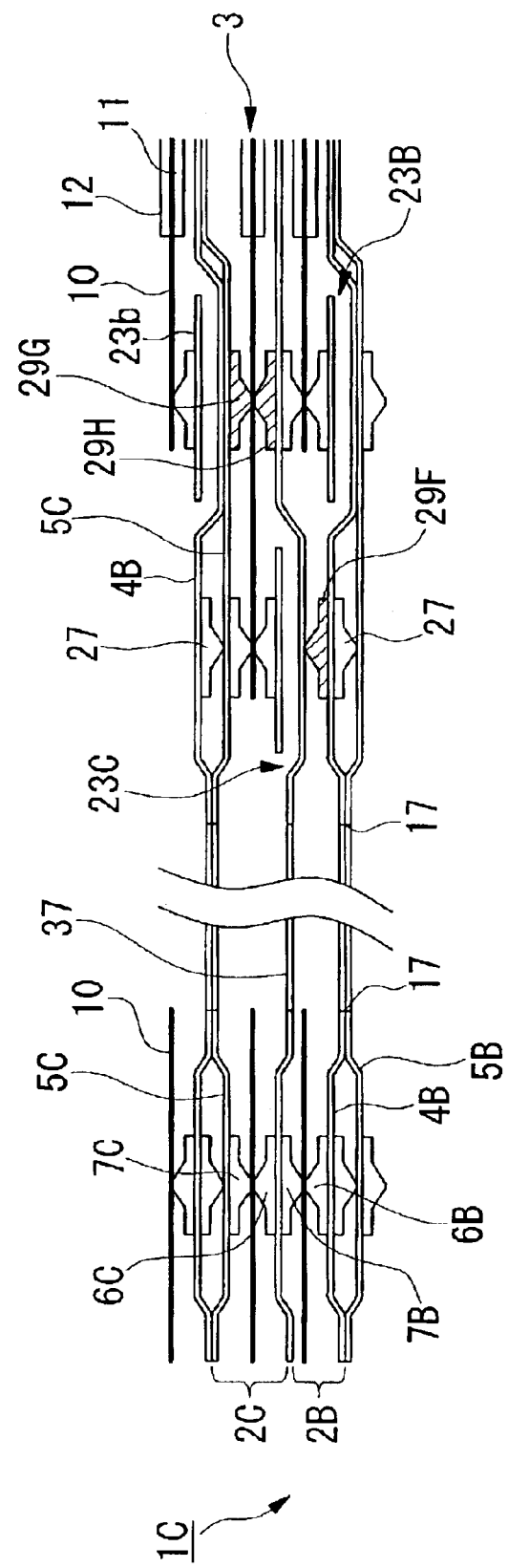
FIG. 18 is a longitudinal cross-sectional view showing, in a manner similar to that in FIG. 12, the fuel cell units according to the third embodiment of the present invention.
Figure 19:
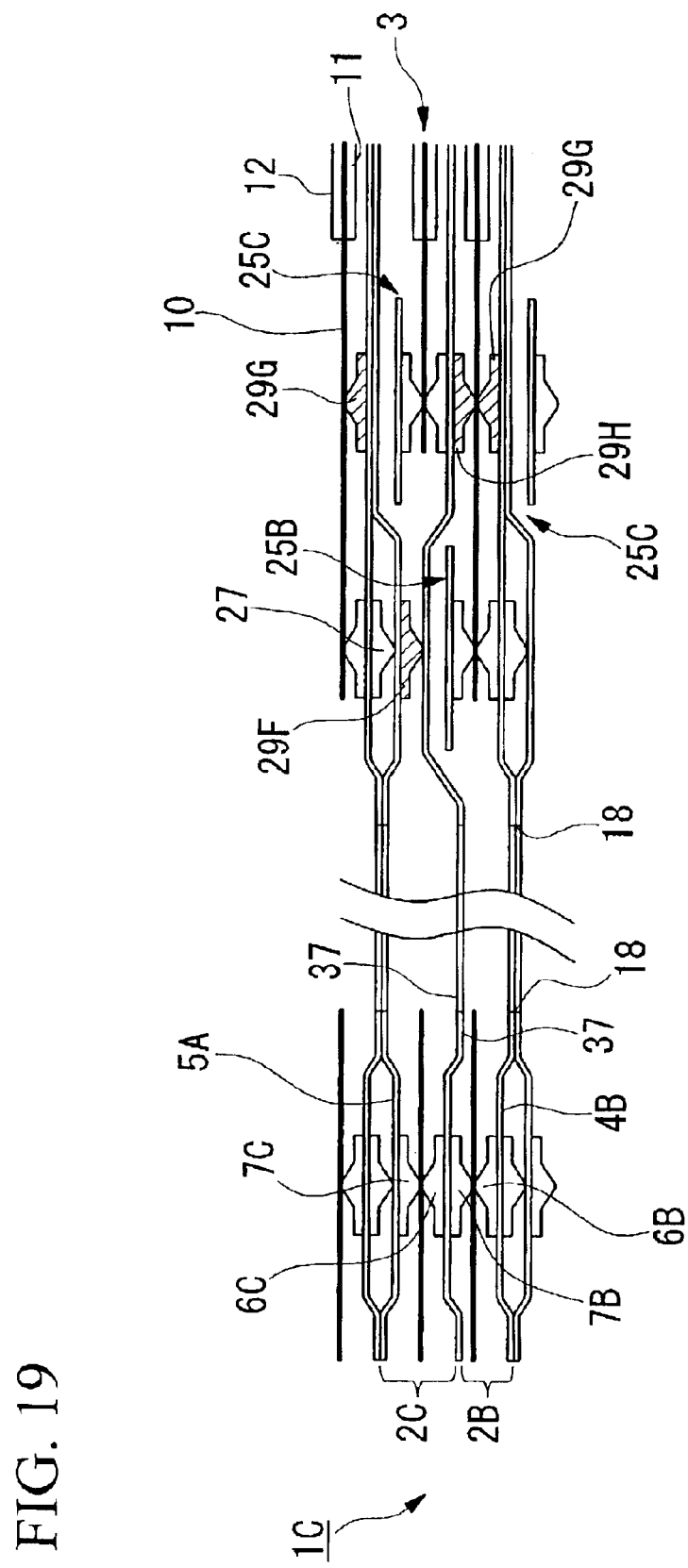
FIG. 19 is a longitudinal cross-sectional view showing, in a manner similar to that in FIG. 13, the fuel cell units shown in FIG. 18.
Figure 20:
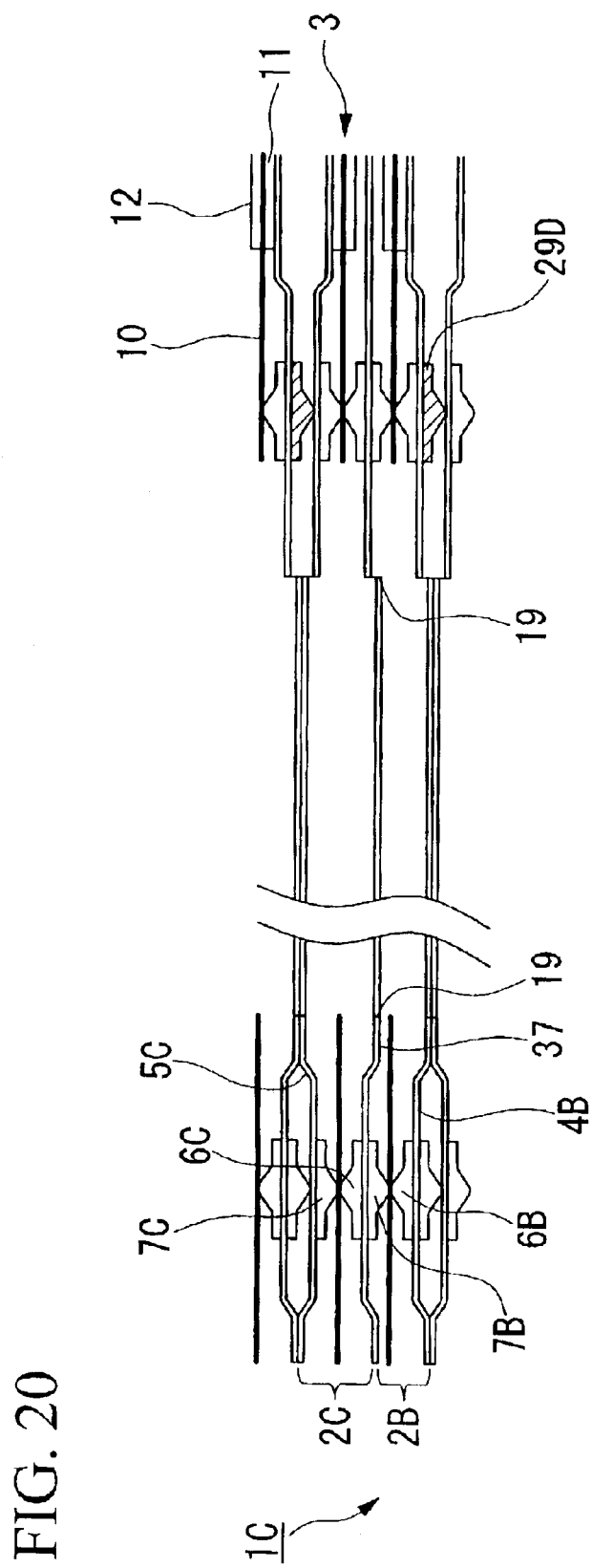
FIG. 20 is a longitudinal cross-sectional view showing, in a manner similar to that in FIG. 14, the fuel cell units shown in FIG. 18.

FIGS. 18 to 20 are longitudinal cross-sectional views similar to FIGS. 12 to 14 showing the first embodiment.

The fuel cell stack 1C according to this embodiment differs from the fuel cell stacks 1A and 1B according to the first and second embodiments in that the cooling medium flow passage 28 is formed every two fuel cell units 2B and 2C, while in the first embodiment, the cooling medium flow passage 28 is formed every fuel cell unit 2A. That is, in the portion where the cooling medium flow passage 28 is formed, two separators 4A and 5A are disposed so as to face each other and the cooling surface sealing member 27 is interposed therebetween so as to form the cooling medium flow passage 28 as in the case of the first embodiment shown in FIG. 17, while in the portion where the cooling medium flow passage 28 is not formed, a single separator 37 is used, which is like a separator formed by integrating the separators 4A and 5A in the first embodiment.

By forming the cooling medium flow passage 28 in every two fuel cell units 2B and 2C, because the number of the cooling surface sealing member 27 is reduced, the cost of the fuel cell stack can be reduced, and also because the thickness of the integrated separator 37, in which the cooling medium flow passage 28 is not formed, is reduced, the dimension in the stacking direction of the fuel stack 1C can be further reduced.

Figure 6A:
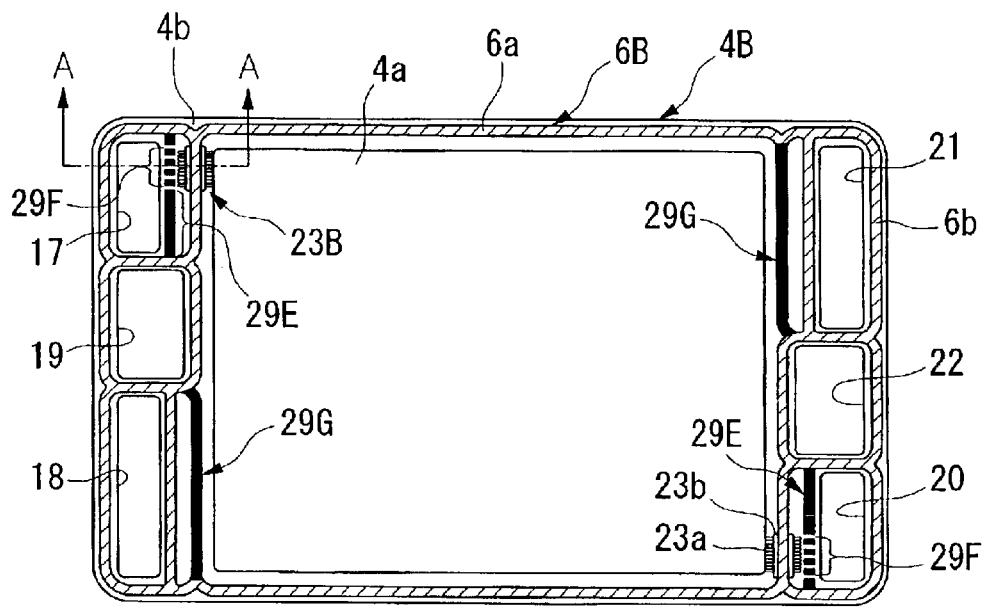
FIGS. 6A and 6B are plan views showing, in a manner similar to that in FIG. 2, one separator of a fuel cell stack according to a third embodiment of the present invention.
Figure 6B:
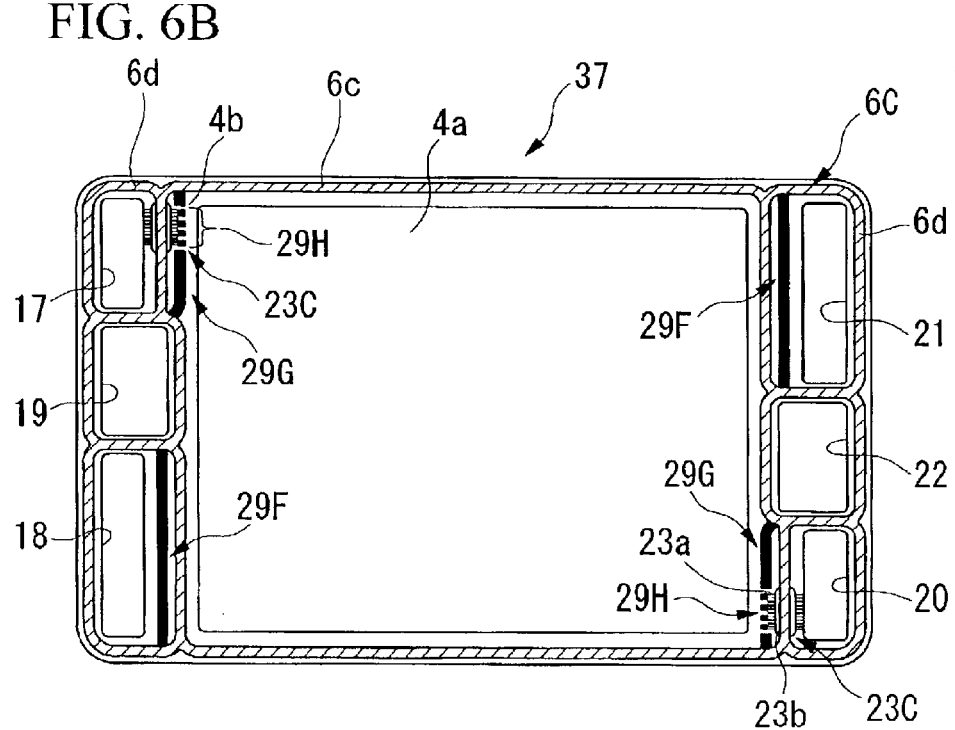

Moreover, in this embodiment, as shown in FIGS. 6A and 6B, the fuel gas communication path 23B in the fuel cell unit 2B and the fuel gas communication path 23C in the fuel cell unit 2C are disposed so as to be offset with respect to each other in the direction from the fuel gas communication port 17 to the membrane electrode assembly 3 as viewed in the stacking direction, i.e., the fuel gas communication path 23C in the fuel cell unit 2C is disposed further outward from the membrane electrode assembly 3 of the fuel cell unit 2B than the fuel gas communication path 23B in the fuel cell unit 2B. In addition, as shown in FIGS. 6A and 6B, in this embodiment as well, support members 29E to 29H are provided that support respective portions of the separator 4B, 37, and 5C. Note that because the support members 29E and 29F are provided between the separators 4B and 37 or between the separators 37 and 5C, the support members 29E and 29F are made of an electrical insulation material. Moreover, because the support members 29G and 29H are provided between the separator 4B and the membrane electrode assembly 3 or between the membrane electrode assembly 3 and the separator 37, the support members 29G and 29H are made of material having corrosion resistance. In addition, the support members 29F and 29H are provided therein with communication recesses 30 to allow the reaction gas (the fuel gas or oxidizing gas) to flow through. The support members 29E and 29F are not provided with communication recesses 30; therefore, the rigidities of the support members 29E and 29F can be further increased.

As constructed as explained above, although the portion of the fuel cell unit 2C that forms the fuel gas communication path 23C is disposed outward from the membrane electrode assembly 3 of the fuel cell unit 2B, the rigidity thereof can be ensured due to the support member 29F. Moreover, by providing the support members 29E to 29H, the rigidities of the portions of the separators 4B, 37, and 5C, at which the gas sealing members 6B and 7B and the cooling surface sealing member 27 are disposed so as to be offset with respect to each other, can be sufficiently ensured. The same description also applies in the case of the fuel gas communication paths 23B and 23C provided near the fuel gas communication port 20.

Figure 7A:
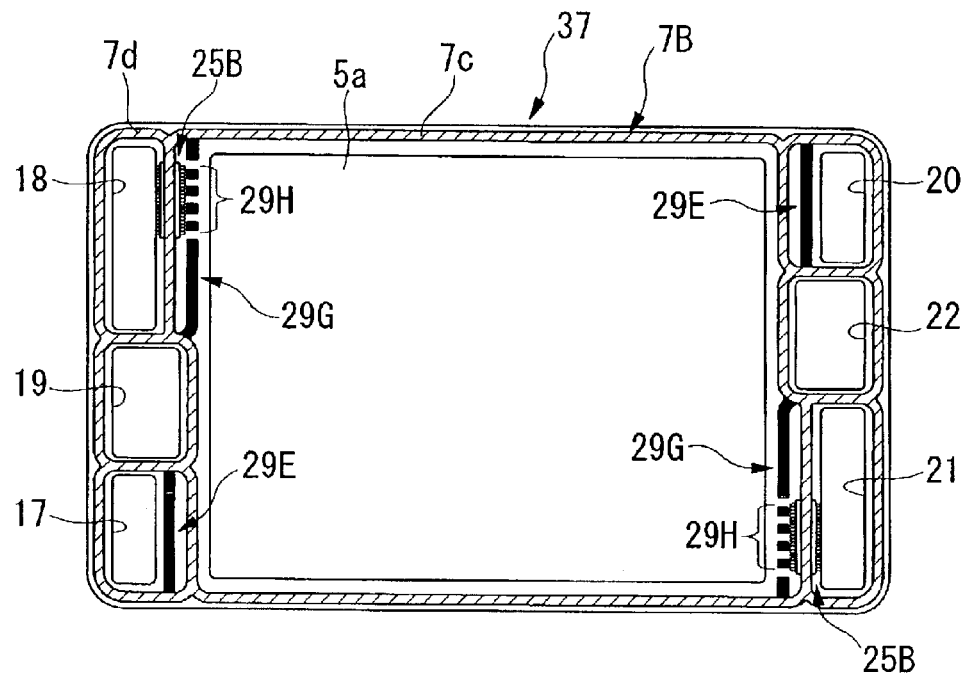
FIGS. 7A and 7B are plan views showing, in a manner similar to that in FIG. 3, another separator of a fuel cell stack according to a third embodiment of the present invention.
Figure 7B:
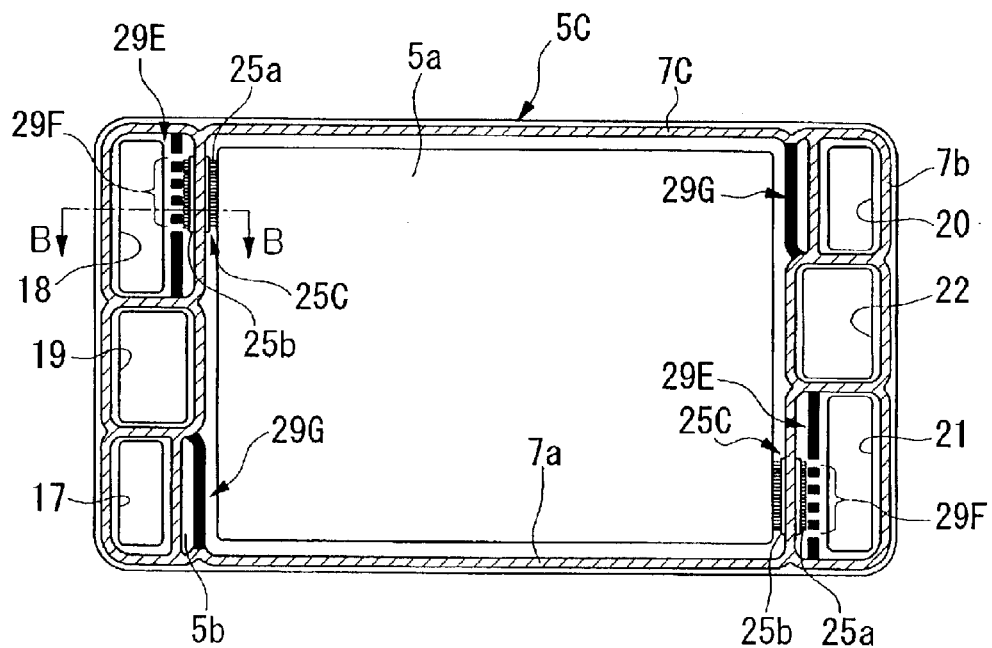

Moreover, as in the case of the fuel gas communication paths 23B and 23C, as shown in FIGS. 7A and 7B, the oxidizing gas communication path 25B in the fuel cell unit 2B and the oxidizing gas communication path 25C in the fuel cell unit 2C are disposed so as to be offset with respect to each other in the direction from the oxidizing gas communication port 18 to the membrane electrode assembly 3 as viewed in the stacking direction. Therefore, the portion of the fuel cell unit 2C that forms the oxidizing gas communication path 23B can be disposed outward from the membrane electrode assembly 3 of the fuel cell unit 2C. As shown in FIG. 18, because the portion of the fuel cell unit 2C is supported by the support member 29F, the rigidity thereof can be ensured. In addition, as in the case of the fuel gas side, by providing the support members 29E to 29H, the rigidities of the portions of the separators 4B, 37, and 5C, at which the gas sealing members 6B and 7B and the cooling surface sealing member 27 are disposed so as to be offset with respect to each other, can be sufficiently ensured. The same description also applies in the case of the oxidizing gas communication paths 25B and 25C provided near the oxidizing gas communication port 20. As explained above, in the fuel cell stack 1C according to the present embodiment, because the thicknesses of the separators 37, 5C, and 4B can be sufficiently reduced while maintaining sealing performance, the size of the fuel cell stack 1C can be further reduced.

Next, FIGS. 21A and 21B to 23 show the fourth embodiment of the present invention and are longitudinal cross-sectional views respectively similar to FIGS. 12 to 14 of the first embodiment. As shown in FIGS. 21A and 21B to 23, a fuel cell unit 1D of this embodiment comprises a fuel cell unit 2D and a fuel cell unit 2E. As shown in FIGS. 21A and 21B, the fuel gas communication path 23D in the fuel cell unit 2D and the fuel gas communication path 23E in the fuel cell unit 2E are disposed so as to be offset with respect to each other in the direction from the fuel gas communication port 17 to the membrane electrode assembly 3 and in the direction crossing this direction as viewed in the stacking direction.

Because the fuel gas communication paths 23D and 23E respectively in the fuel cell unit 2D and 2E are disposed so as to be offset with respect to each other in the direction from the fuel gas communication port 17 to the membrane electrode assembly 3 and in the direction crossing this direction, the gas sealing members 6E and 7E of the fuel cell unit 2E can be disposed so as to be offset from the portion of the fuel cell unit 2D where the fuel gas communication path 23D is formed, i.e., the gas sealing members 6E and 7E can be disposed outward from the membrane electrode assembly 3 of the fuel cell unit 2D.

Figure 8A:
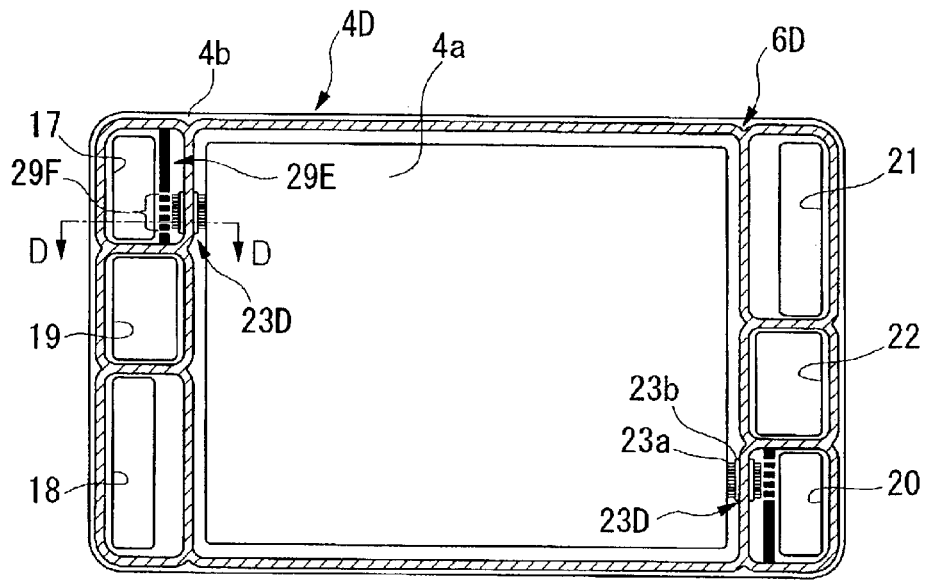
FIGS. 8A and 8B are plan views showing, in a manner similar to that in FIG. 2, one separator of a fuel cell stack according to a fourth embodiment of the present invention.
Figure 8B:
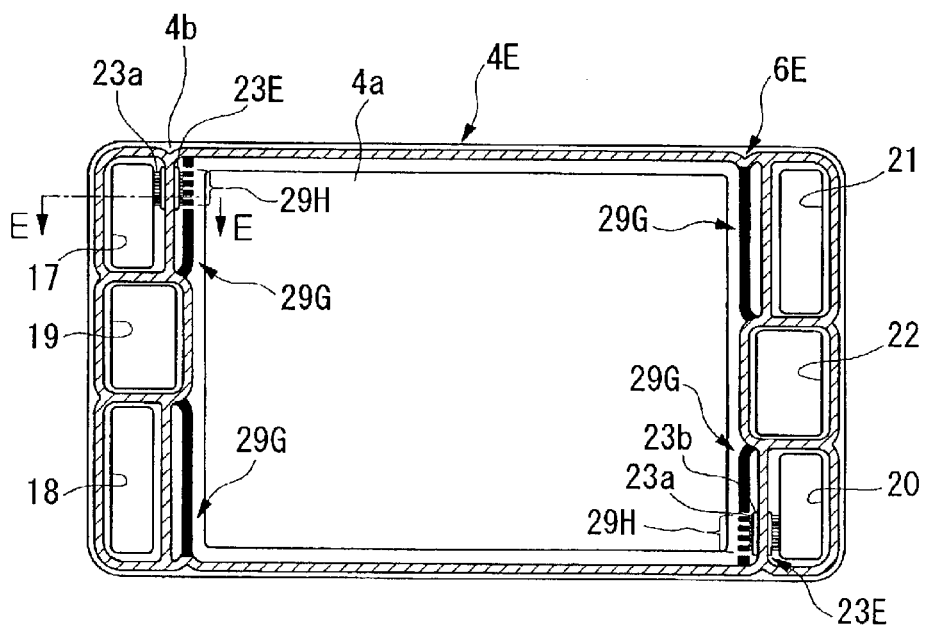
Figure 10:
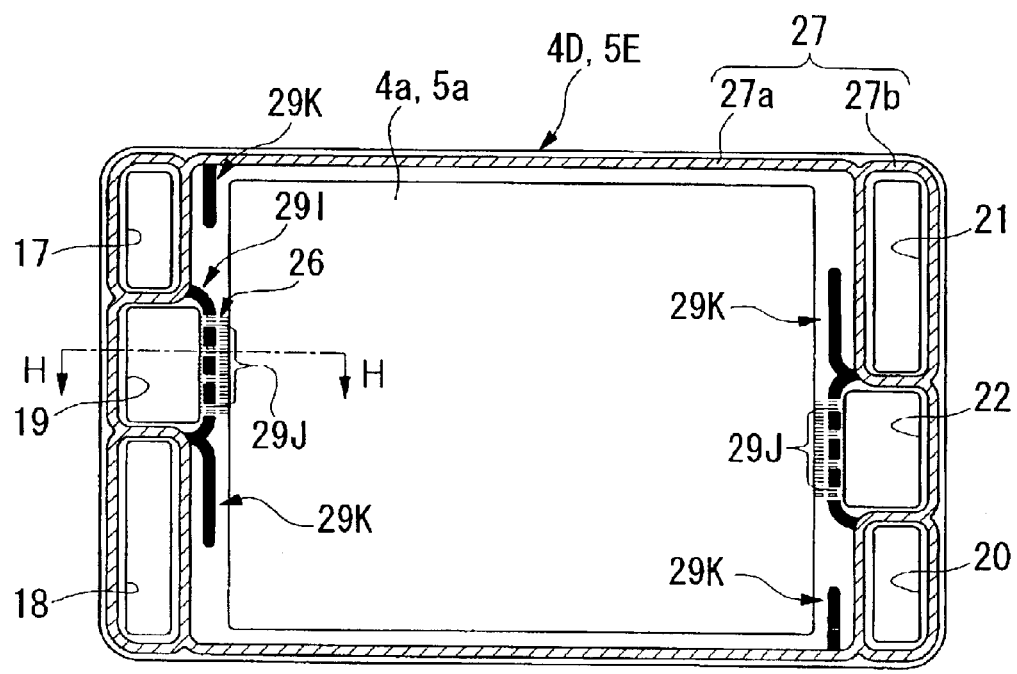
FIG. 10 is a plan view showing a state in which a cooling surface sealing member and support members are provided on the rear surfaces the separators shown in FIGS. 8 and 9.
Figure 22A:
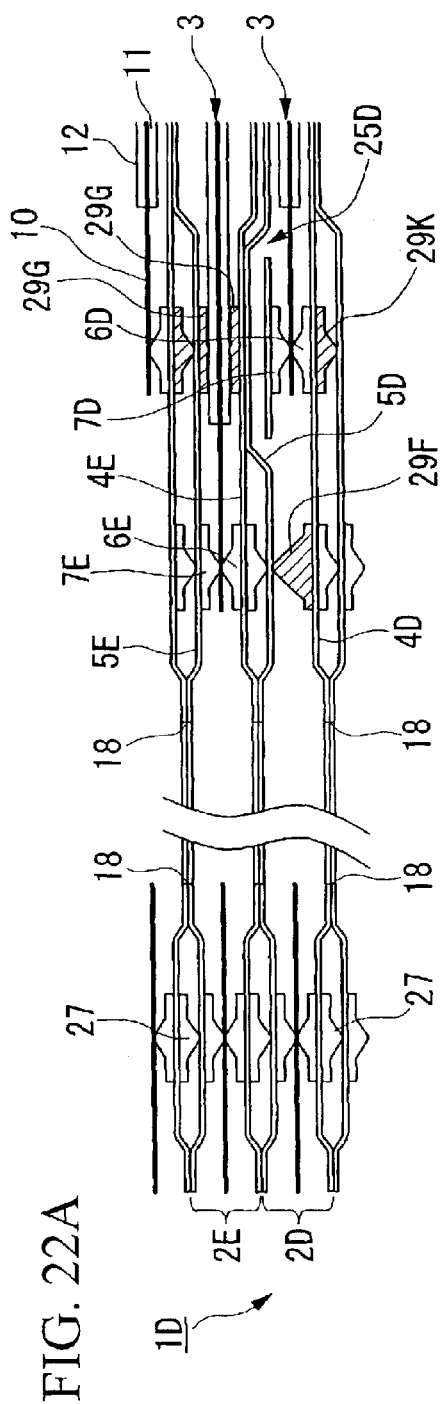
FIG. 22A is a longitudinal cross-sectional view taken along the line F—F in FIG. 9A showing the fuel cell shown in FIGS. 21A and 21B.
Figure 22B:
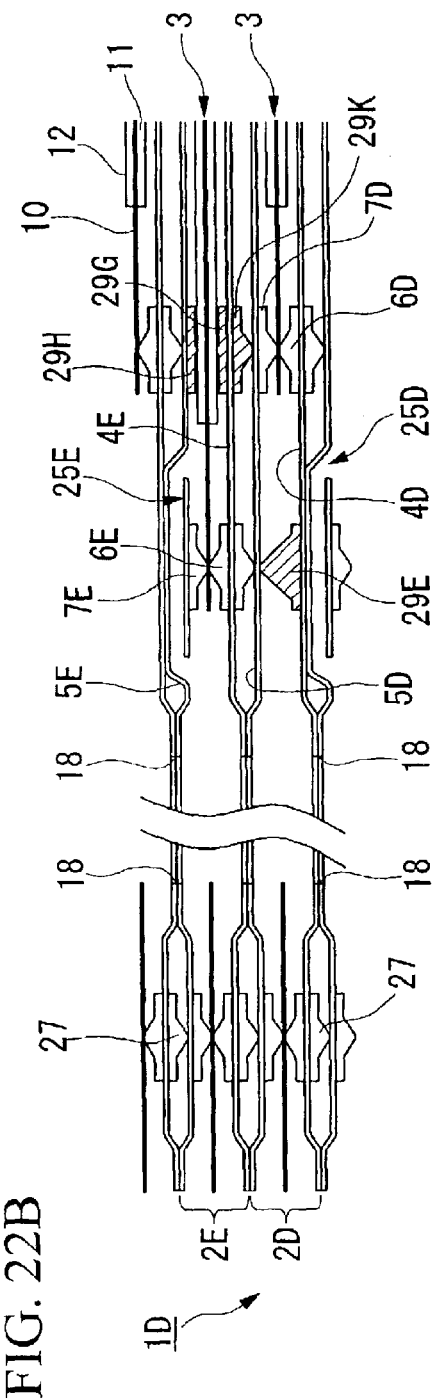
FIG. 22B is a longitudinal cross-sectional view taken along the line G—G in FIG. 9B showing the fuel cell shown in FIGS. 21A and 21B.
Figure 23:
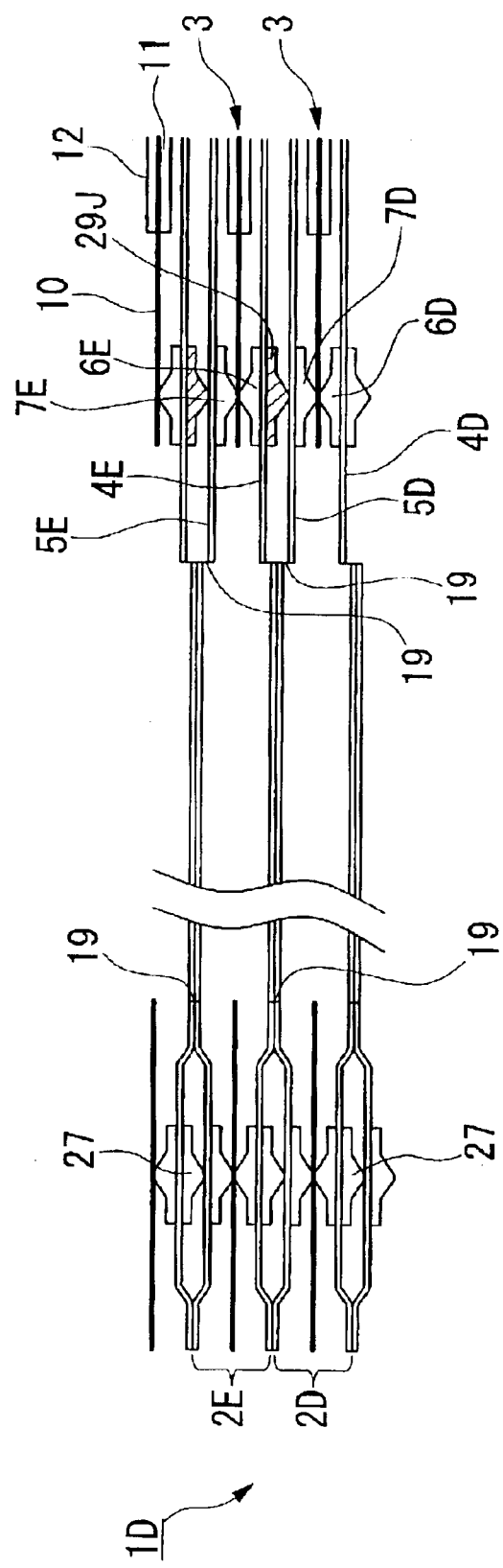
FIG. 23 is a longitudinal cross-sectional view taken along the line H—H in FIG. 10 showing the fuel cell shown in FIG. 21.
Figure 24:
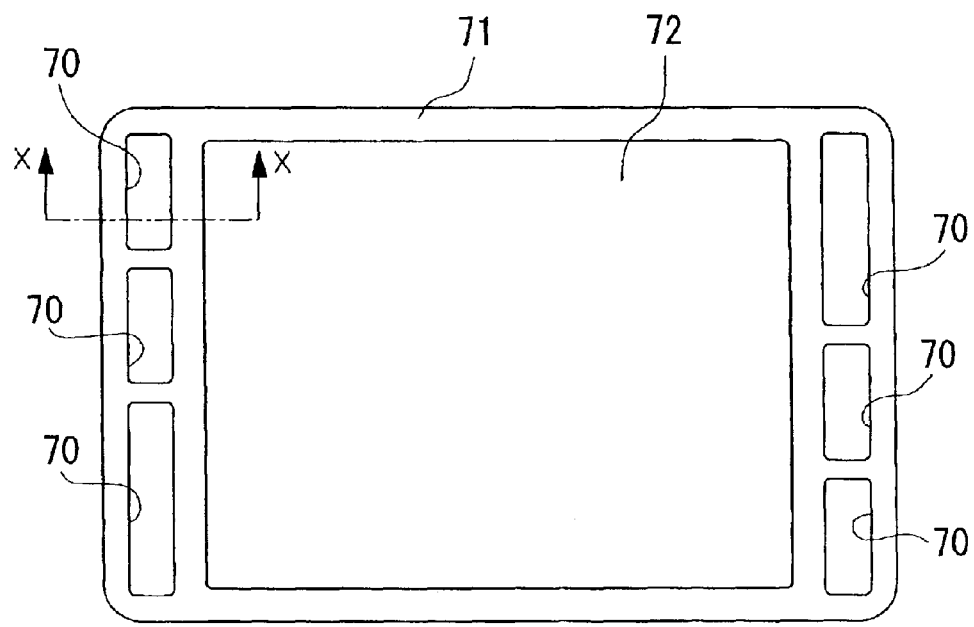
FIG. 24 is a plan view schematically showing a fuel cell unit in a conventional fuel cell.
Figure 25:
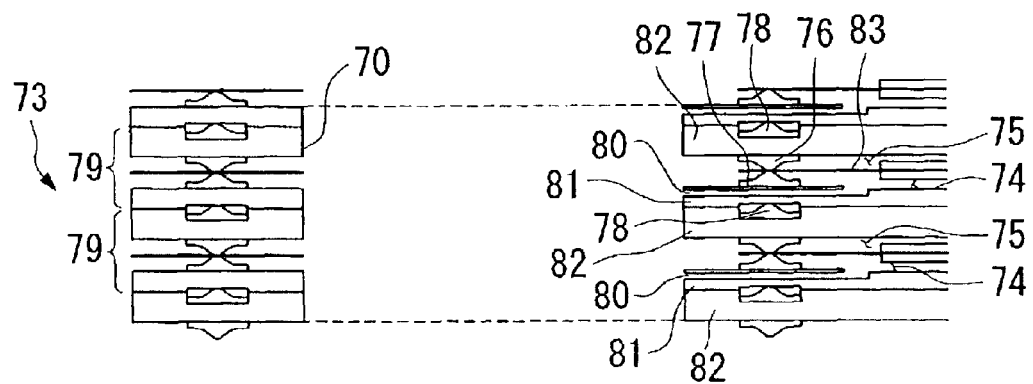
FIG. 25 is a longitudinal cross-sectional view showing the vicinity of a communication port in the fuel cell shown in FIG. 24 taken along the line X—X.

Moreover, as shown in FIGS. 8A and 8B, in this embodiment as in the third embodiment, the support members 29E to 29H are provided that support respective portions of the separator 4D, 4E, 5D, and 5E. Due to the support members 29E to 29H, the portion of the fuel cell unit 2E where the fuel gas communication path 23E is formed can be positioned outward from the membrane electrode assembly 3 of the fuel cell unit 2D while maintaining the rigidity of the portion; therefore, the thicknesses of the fuel cell units 2D and 2E can be reduced. The same description also applies in the case of the fuel gas communication paths 23D and 23E provided near the fuel gas communication port 20. Furthermore, as shown in FIGS. 22A and 22B, the same description also applies in the case of the oxidizing gas communication paths 25D of the fuel cell unit 2D, and in the case of the oxidizing gas communication paths 25E of the fuel cell unit 2E. In addition, in this embodiment, as shown in FIG. 10, support members 29I to 29K are provided on the surface of the separators 4D and 5E where the cooling surface sealing member 27 is provided so as to increase the rigidity thereof. As a result, the size of the fuel cell stack can be further reduced.

In the above description of the embodiments, the support members are formed separately from the separators; however, the support members may be integrated with the respective separators. For example, in the case of a carbon separator, the support members may be formed by making the separator to be thick in a part thereof, and the communication paths may be formed by making concave portions and convex portions therein. Moreover, the above embodiments are merely examples, and the present invention is applicable to other embodiments. For example, the separators in the second and third embodiments may be made of carbon, or the cooling medium flow passage may be formed every two fuel cell units or every three fuel cell units, instead of forming every fuel cell unit.

As explained above, according to the first aspect of the present invention, the rigidities of the portions of the separators, at which the gas sealing members and the cooling surface sealing member are disposed so as to be offset with respect to each other, are ensured. Therefore, the thickness of the separator can be sufficiently reduced while preventing deformation thereof. Moreover, it is possible to apply sufficient sealing pressure to the gas sealing members and the cooling surface sealing member that are disposed so as to be offset with respect to each other. Therefore, sufficient sealing performance can be ensured even if the thickness of the separator is reduced. As a result, the size of the fuel cell stack can be greatly reduced.

According to another aspect of the present invention, the thicknesses of the portions of the separators, at which the communication paths are disposed so as to be offset with respect to each other, may be reduced, and also the portions of the separators may be disposed so as to be offset with respect to each other as viewed in the stacking direction. Therefore, the size of the fuel cell stack can be further reduced.

According to another aspect of the present invention, the reaction gases or the cooling medium can be supplied through the communication recesses formed in the support members, and the rigidity of the portion of the separators, at which the support members are provided, can be increased. Therefore, the size of the fuel cell stack can be further reduced.

What is claimed is:

1. A fuel cell comprising fuel cell units, the fuel cell units being stacked and having at least one cooling medium flow passage therebetween, and the cooling medium flow passage sealed by a cooling surface sealing member, each fuel cell unit comprising:

an electrode assembly formed by disposing an electrode on each side of an electrolyte;

separators that sandwich the electrode assembly in the thickness direction thereof; and gas sealing members that are disposed at an outer peripheral portion of the electrode assembly, and that seal respective reaction gas flow passages that are formed between each separator and the electrode assembly and are bounded by the separators and electrode assembly, wherein in each of the separators there are provided reaction gas communication ports, and cooling medium communication ports that penetrate each of the separators in the thickness direction thereof, and communication paths that detour around the gas sealing members in the thickness direction of the separators and connect the reaction gas communication ports with the reaction gas flow passages; and wherein the portions of the separators, at which the gas sealing members and the cooling surface sealing member are disposed so as to be offset with respect to each other as viewed in the stacking direction, are supported by support members.

2. The fuel cell according to claim 1, wherein the communication paths in one fuel cell unit and the corresponding communication paths in the adjacent fuel cell unit in the stacking direction are disposed so as to be offset with respect to each other as viewed in the stacking direction, and wherein at least a portion of each of the support members supports a portion of the separators at which the communication paths are formed.

3. The fuel cell according to claim 1, wherein each of the support members disposed over the reaction gas flow passages or the cooling medium flow passage is provided with communication recesses that allow the reaction gases or the cooling medium to flow through.

4. The fuel cell according to claim 2, wherein each of the support members disposed over the reaction gas flow passages or the cooling medium flow passage is provided with communication recesses that allow the reaction gases or the cooling medium to flow through.

* * * * *